US012223679B2

(12) United States Patent
Raghoebardajal et al.

(10) Patent No.: US 12,223,679 B2
(45) Date of Patent: Feb. 11, 2025

(54) DATA PROCESSING

(71) Applicant: Sony Interactive Entertainment Inc., Tokyo (JP)

(72) Inventors: Sharwin Winesh Raghoebardajal, London (GB); Takanori Minamino, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 382 days.

(21) Appl. No.: 17/609,492

(22) PCT Filed: Apr. 24, 2020

(86) PCT No.: PCT/GB2020/051017
§ 371 (c)(1),
(2) Date: Nov. 8, 2021

(87) PCT Pub. No.: WO2020/234559
PCT Pub. Date: Nov. 26, 2020

(65) Prior Publication Data
US 2022/0230357 A1 Jul. 21, 2022

(30) Foreign Application Priority Data
May 22, 2019 (GB) ...................................... 1907208

(51) Int. Cl.
*G06T 7/73* (2017.01)
*G06T 7/80* (2017.01)
(Continued)

(52) U.S. Cl.
CPC .................. *G06T 7/75* (2017.01); *G06T 7/80* (2017.01); *G06T 15/08* (2013.01); *H04N 7/181* (2013.01)

(58) Field of Classification Search
None
See application file for complete search history.

(56) References Cited

U.S. PATENT DOCUMENTS 11,657,419 B2 * 5/2023 Eder .......................... G06T 7/80
345/418
12,056,899 B2 * 8/2024 Williams ............. H04N 13/388
(Continued)

FOREIGN PATENT DOCUMENTS

| EP | 3441788 A1 | 2/2019 |
| WO | 2017027338 A1 | 2/2017 |
| WO | 2019064399 A1 | 4/2019 |

OTHER PUBLICATIONS

English translation WO/2019/064399; Tasuo Tsuchie Apr. 4, 2019 (Year: 2019).*

(Continued)

*Primary Examiner* — Nancy Bitar
(74) *Attorney, Agent, or Firm* — Kilpatrick Townsend & Stockton LLP

(57) ABSTRACT

A data processing device includes a plurality of cameras arranged according to a predetermined configuration, where each camera is configured to capture successive images and to detect a current location of one or more elements in the captured images with respect to a coordinate system of the camera, a processor to generate a common camera coordinate system in dependence upon the respective coordinate systems of the plurality of cameras, the common camera coordinate system comprising a set of locations in a three-dimensional space included within the field of view of the plurality of cameras, and a detector to detect a current location of a given element with respect to the common camera coordinate system based on images captured by the plurality of cameras, wherein for each camera, the processor is configured, in response to a detection by the detector that the current location of the given element corresponds to a location in the set of locations of the common camera coordinate system, to generate first data for that location in the set of locations indicative of a mapping between the (Continued)

coordinate system for the camera and the common camera coordinate system, and wherein in response to a detection of a location in the set of locations for which the first data is indicative of the mapping for two or more cameras with respect to the common camera coordinate system, the processor is configured to generate second data for that location indicative of a mapping between the coordinate systems for the two or more cameras.

14 Claims, 14 Drawing Sheets

(51) Int. Cl.
    *G06T 15/08*      (2011.01)
    *H04N 7/18*      (2006.01)

(56) References Cited

U.S. PATENT DOCUMENTS

| | | | | |
|---|---|---|---|---|
| 2004/0247174 A1* | 12/2004 | Lyons | ........................ | G06T 7/55 382/154 |
| 2013/0129192 A1* | 5/2013 | Wang | ................... | H04N 13/111 382/154 |
| 2014/0132718 A1* | 5/2014 | Suh | .................... | H04N 21/4345 348/43 |
| 2014/0232717 A1* | 8/2014 | Schpok | ................... | G01S 17/89 345/420 |
| 2017/0098305 A1* | 4/2017 | Gossow | .................. | G06T 15/06 |
| 2018/0288389 A1* | 10/2018 | Kirmani | .................... | G06T 7/70 |
| 2019/0005678 A1 | 1/2019 | Lindner | | |
| 2019/0213789 A1* | 7/2019 | Uyyala | ................. | G06T 17/005 |
| 2019/0329485 A1* | 10/2019 | Langeveld | .............. | B29C 66/43 |
| 2019/0364265 A1* | 11/2019 | Matsunobu | .......... | H04N 13/194 |
| 2020/0279401 A1 | 9/2020 | Tsuchie | | |
| 2021/0133929 A1* | 5/2021 | Ackerson | .............. | G06T 3/4076 |
| 2021/0142551 A1* | 5/2021 | Kobayashi | .............. | G06T 15/20 |
| 2021/0152802 A1* | 5/2021 | Varekamp | ............ | H04N 13/254 |
| 2021/0243472 A1* | 8/2021 | Jung | ...................... | H04N 19/70 |

OTHER PUBLICATIONS

Combined Search and Examination Report for corresponding GB Application No. GB1907208.1, 6 pages, dated Nov. 20, 2019.
International Search Report and Written Opinion for corresponding PCT Application No. PCT/GB2020/051017, 16 pages, dated Jun. 23, 2020.
Examination Report for corresponding GB Application No. GB1907208. 1, 9 pages, dated Aug. 17, 2023.
Communication pursuant to Article 94(3) EPC for corresponding EP Application No. 20723497.2, 9 pages dated Feb. 28, 2024.

* cited by examiner

DATA PROCESSING

BACKGROUND

Field of the Disclosure

This disclosure relates to virtual reality systems and methods.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

A head-mountable display (HMD) is one example of a head-mountable apparatus for use in a virtual reality system in which an HMD wearer views a virtual environment. In an HMD, an image or video display device is provided which may be worn on the head or as part of a helmet. Either one eye or both eyes are provided with small electronic display devices.

It has been proposed to provide detection arrangements for detecting a relative location of one device (such as an HMD) from another device, by using a camera on the one device to detect images of one or more markers, for example on the other device.

Although the original development of HMDs and virtual reality was perhaps driven by the military and professional applications of these devices, HMDs are becoming more popular for use by casual users in, for example, computer game or domestic computing applications.

The foregoing paragraphs have been provided by way of general introduction, and are not intended to limit the scope of the following claims. The described embodiments, together with further advantages, will be best understood by reference to the following detailed description taken in conjunction with the accompanying drawings.

SUMMARY

An example embodiment provides a data processing apparatus comprising:
  a plurality of cameras arranged according to a predetermined configuration, wherein each camera is configured to capture successive images and to detect a current location of one or more elements in the captured images with respect to a coordinate system of the camera;
  a processor to generate a common camera coordinate system in dependence upon the respective coordinate systems of the plurality of cameras, the common camera coordinate system comprising a set of locations in a three-dimensional space included within the field of view of the plurality of cameras; and
  a detector to detect a current location of a given element with respect to the common camera coordinate system based on images captured by the plurality of cameras, wherein
  for each camera, the processor is configured, in response to a detection by the detector that the current location of the given element corresponds to a location in the set of locations of the common camera coordinate system, to generate first data for that location in the set of locations indicative of a mapping between the coordinate system for the camera and the common camera coordinate system, and wherein
  in response to a detection of a location in the set of locations for which the first data is indicative of the mapping for two or more cameras with respect to the common camera coordinate system, the processor is configured to generate second data for that location indicative of a mapping between the coordinate systems for the two or more cameras.

Another example embodiment provides a method comprising:
  capturing successive images using a plurality of cameras arranged according to a predetermined configuration and each having a coordinate system;
  detecting a current location of one or more elements in the captured images with respect to the coordinate system of a camera;
  generating a common camera coordinate system in dependence upon the respective coordinate systems of the plurality of cameras, the common camera coordinate system comprising a set of locations in a three-dimensional space included within the field of view of the plurality of cameras;
  detecting a current location of a given element with respect to the common camera coordinate system based on images captured by the plurality of cameras;
  for each camera:
  generating, in response to detecting that the current location of the given element corresponds to a location in the set of locations of the common camera coordinate system, first data for that location in the set of locations indicative of a mapping between the coordinate system for the camera and the common camera coordinate system; and
  generating, in response to a detection of a location in the set of locations for which the first data is indicative of the mapping for two or more cameras with respect to the common camera coordinate system, second data for that location indicative of a mapping between the coordinate systems for the two or more cameras.

Example embodiments provide computer software which, when executed by a computer, causes the computer to perform the steps of the methods defined above.

Example embodiments provide a machine-readable, non-transitory storage medium which stores such computer software.

Various other aspects and features of the present disclosure are defined in the appended claims and within the text of the accompanying description and include at least a head mountable apparatus such as a display and a method of operating a head-mountable apparatus as well as a computer program.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
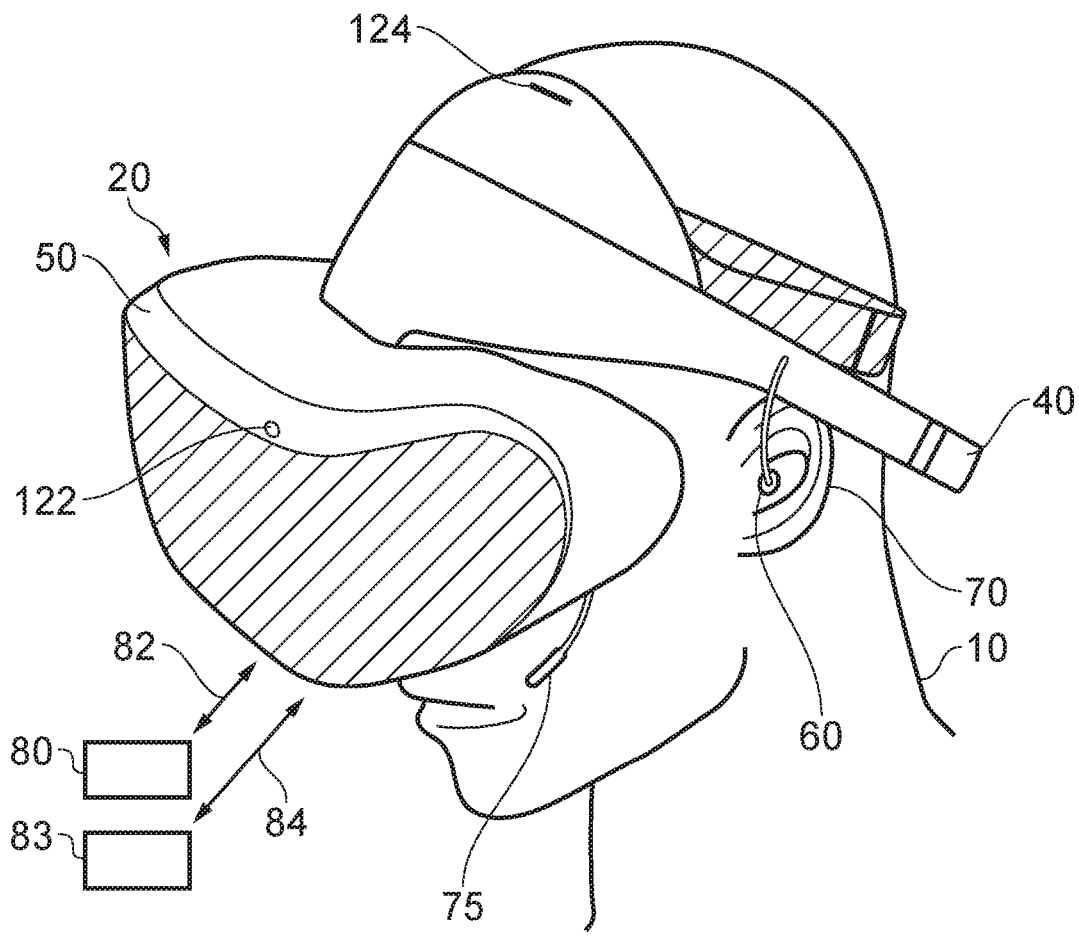
FIG. 1 schematically illustrates an HMD worn by a user.

Referring now to FIG. 1, a user 10 is wearing an HMD 20 (as an example of a generic head-mountable apparatus or virtual reality apparatus). The HMD comprises a frame 40, in this example formed of a rear strap and a top strap, and a display portion 50.

Note that the HMD of FIG. 1 may comprise further features, to be described below in connection with other drawings, but which are not shown in FIG. 1 for clarity of this initial explanation.

The HMD of FIG. 1 completely (or at least substantially completely) obscures the user's view of the surrounding environment. All that the user can see is the pair of images displayed within the HMD.

The HMD has associated headphone audio transducers or earpieces 60 which fit into the user's left and right ears 70. The earpieces 60 replay an audio signal provided from an external source, which may be the same as the video signal source which provides the video signal for display to the user's eyes. A boom microphone 75 is mounted on the HMD so as to extend towards the user's mouth.

The combination of the fact that the user can see only what is displayed by the HMD and, subject to the limitations of the noise blocking or active cancellation properties of the earpieces and associated electronics, can hear only what is provided via the earpieces, mean that this HMD may be considered as a so-called "full immersion" HMD. Note however that in some embodiments the HMD is not a full immersion HMD, and may provide at least some facility for the user to see and/or hear the user's surroundings. This could be by providing some degree of transparency or partial transparency in the display arrangements, and/or by projecting a view of the outside (captured using a camera, for example a camera mounted on the HMD) via the HMD's displays, and/or by allowing the transmission of ambient sound past the earpieces and/or by providing a microphone to generate an input sound signal (for transmission to the earpieces) dependent upon the ambient sound.

A front-facing camera 122 may capture images to the front of the HMD, in use. A Bluetooth® antenna 124 may provide communication facilities or may simply be arranged as a directional antenna to allow a detection of the direction of a nearby Bluetooth transmitter.

In operation, a video signal is provided for display by the HMD. This could be provided by an external video signal source 80 such as a video games machine or data processing apparatus (such as a personal computer), in which case the signals could be transmitted to the HMD by a wired or a wireless connection 82. Examples of suitable wireless connections include Bluetooth® connections. Audio signals for the earpieces 60 can be carried by the same connection. Similarly, any control signals passed from the HMD to the video (audio) signal source may be carried by the same connection. Furthermore, a power supply 83 (including one or more batteries and/or being connectable to a mains power outlet) may be linked by a cable 84 to the HMD. Note that the power supply 83 and the video signal source 80 may be separate units or may be embodied as the same physical unit. There may be separate cables for power and video (and indeed for audio) signal supply, or these may be combined for carriage on a single cable (for example, using separate conductors, as in a USB cable, or in a similar way to a "power over Ethernet" arrangement in which data is carried as a balanced signal and power as direct current, over the same collection of physical wires). The video and/or audio signal may be carried by, for example, an optical fibre cable. In other embodiments, at least part of the functionality associated with generating image and/or audio signals for presentation to the user may be carried out by circuitry and/or processing forming part of the HMD itself. A power supply may be provided as part of the HMD itself.

Some embodiments of the disclosure are applicable to an HMD having at least one electrical and/or optical cable linking the HMD to another device, such as a power supply and/or a video (and/or audio) signal source. So, embodiments of the disclosure can include, for example:

(a) an HMD having its own power supply (as part of the HMD arrangement) but a cabled connection to a video and/or audio signal source;

(b) an HMD having a cabled connection to a power supply and to a video and/or audio signal source, embodied as a single physical cable or more than one physical cable;

(c) an HMD having its own video and/or audio signal source (as part of the HMD arrangement) and a cabled connection to a power supply;

(d) an HMD having a wireless connection to a video and/or audio signal source and a cabled connection to a power supply; or (e) an HMD having its own video and/or audio signal source and its own power supply (both as part of the HMD arrangement).

If one or more cables are used, the physical position at which the cable 82 and/or 84 enters or joins the HMD is not particularly important from a technical point of view. Aesthetically, and to avoid the cable(s) brushing the user's face in operation, it would normally be the case that the cable(s) would enter or join the HMD at the side or back of the HMD (relative to the orientation of the user's head when worn in normal operation). Accordingly, the position of the cables 82, 84 relative to the HMD in FIG. 1 should be treated merely as a schematic representation.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other (not full immersion) examples, the user's view of the external environment may not in fact be entirely obscured; the displayed images could be arranged so as to be superposed (from the user's point of view) over the external environment. An example of such an arrangement will be described below with reference to FIG. 4.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element 150 and one or more optical elements 160. The way in which the display element and the optical element(s) cooperate to provide a display to the user will be described with reference to FIG. 3.

Figure 3:
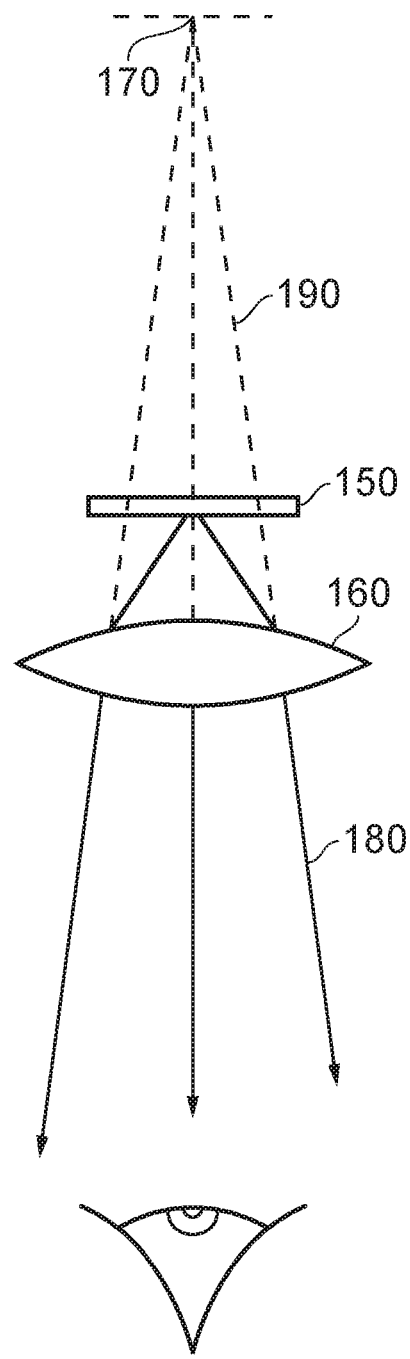
FIG. 3 schematically illustrates the formation of a virtual image by an HMD.

Referring to FIG. 3, the display element 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several metres. In FIG. 3, solid lines (such as the line 180) are used to denote real optical rays, whereas broken lines (such as the line 190) are used to denote virtual rays.

Figure 4:
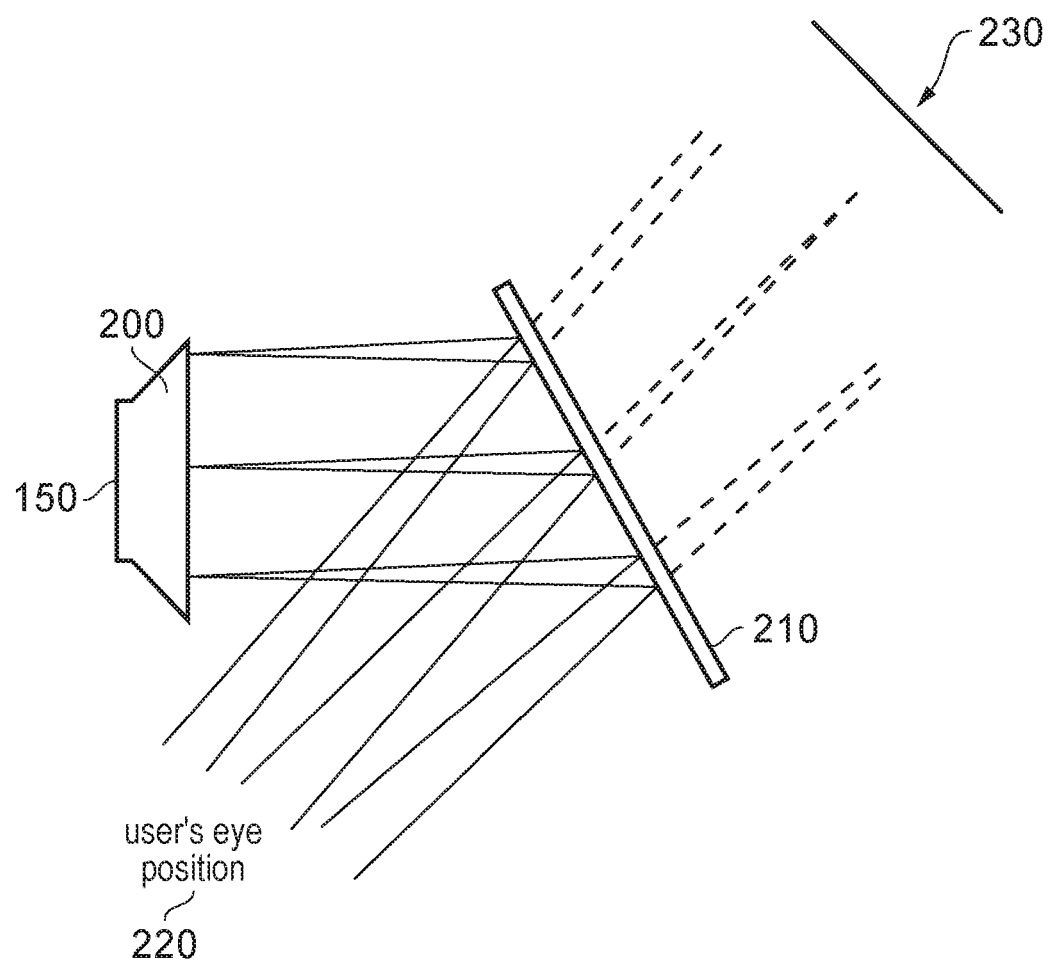
FIG. 4 schematically illustrates another type of display for use in an HMD.

An alternative arrangement is shown in FIG. 4. This arrangement may be used where it is desired that the user's view of the external environment is not entirely obscured. However, it is also applicable to HMDs in which the user's external view is wholly obscured. In the arrangement of FIG. 4, the display element 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the user's view of the external surroundings is entirely obscured, the mirror 210 can be a substantially 100% reflective mirror. The arrangement of FIG. 4 then has the advantage that the display element and optical elements can be located closer to the centre of gravity of the user's head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

Figure 5:
FIG. 5 schematically illustrates a pair of stereoscopic images.

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer.

In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint needs to track movements with respect to a real or virtual space in which the user is located.

Figure 6:
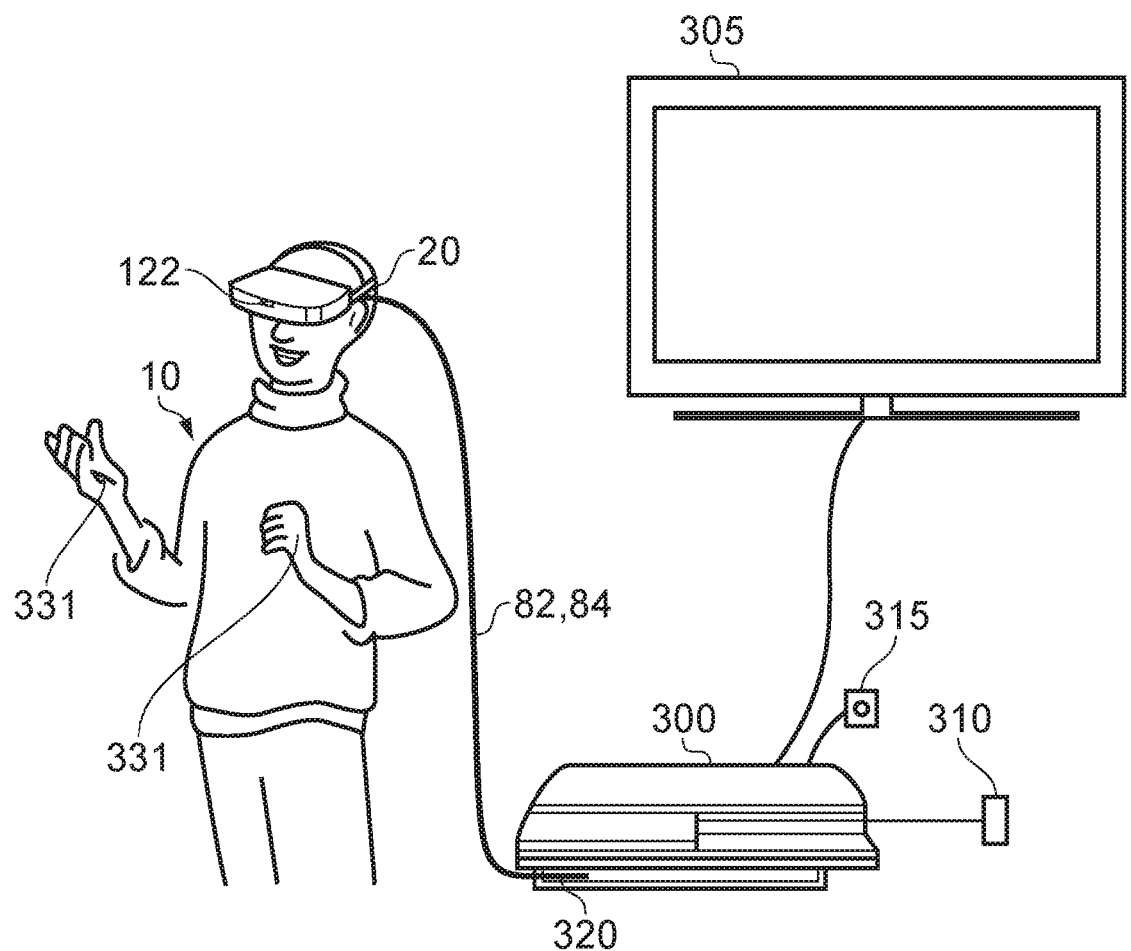
FIGS. 6 and 7 schematically illustrate a user wearing an HMD connected to a Sony® PlayStation 3® games console.

FIG. 6 schematically illustrates an example virtual reality system and in particular shows a user wearing an HMD connected to a Sony® PlayStation 3® games console 300 as an example of a base device. The games console 300 is connected to a mains power supply 310 and (optionally) to a main display screen (not shown). A cable, acting as the cables 82, 84 discussed above (and so acting as both power supply and signal cables), links the HMD 20 to the games console 300 and is, for example, plugged into a USB socket 320 on the console 300. Note that in the present embodiments, a single physical cable is provided which fulfils the functions of the cables 82, 84.

The video displays in the HMD 20 are arranged to display images generated by the games console 300, and the earpieces 60 in the HMD 20 are arranged to reproduce audio signals generated by the games console 300. Note that if a USB type cable is used, these signals will be in digital form when they reach the HMD 20, such that the HMD 20 comprises a digital to analogue converter (DAC) to convert at least the audio signals back into an analogue form for reproduction.

Images from the camera 122 mounted on the HMD 20 are passed back to the games console 300 via the cable 82, 84. Similarly, if motion or other sensors are provided at the HMD 20, signals from those sensors may be at least partially processed at the HMD 20 and/or may be at least partially processed at the games console 300. The use and processing of such signals will be described further below.

The USB connection from the games console 300 also provides power to the HMD 20, according to the USB standard.

FIG. 6 also shows a separate display 305 such as a television or other openly viewable display (by which it is meant that viewers other than the HMD wearer may see images displayed by the display 305) and a camera 315, which may be (for example) directed towards the user (such as the HMD wearer) during operation of the apparatus. An example of a suitable camera is the PlayStation Eye camera, although more generally a generic "webcam", connected to the console 300 by a wired (such as a USB) or wireless (such as WiFi or Bluetooth) connection.

The display 305 may be arranged (under the control of the games console) to provide the function of a so-called "social screen". It is noted that playing a computer game using an HMD can be very engaging for the wearer of the HMD but less so for other people in the vicinity (particularly if they are not themselves also wearing HMDs). To provide an improved experience for a group of users, where the number of HMDs in operation is fewer than the number of users, images can be displayed on a social screen. The images displayed on the social screen may be substantially similar to those displayed to the user wearing the HMD, so that viewers of the social screen see the virtual environment (or a subset, version or representation of it) as seen by the HMD wearer. In other examples, the social screen could display other material such as information relating to the HMD wearer's current progress through the ongoing computer game. For example, the HMD wearer could see the game environment from a first person viewpoint whereas the social screen could provide a third person view of activities and movement of the HMD wearer's avatar, or an overview of a larger portion of the virtual environment. In these examples, an image generator (for example, a part of the functionality of the games console) is configured to generate some of the virtual environment images for display by a display separate to the head mountable display.

In FIG. 6 the user is wearing one or two so-called haptic gloves 331. These can include actuators to provide haptic feedback to the user, for example under the control of processing carried out by the console 300. They may also provide configuration and/or location sensing as discussed below.

Note that other haptic interfaces can be used, providing one or more actuators and/or one or more sensors. For example, a so-called haptics suit may be worn by the user. Haptic shoes may include one or more actuators and one or more sensors. Or the user could stand on or hold a haptic interface device. The one or more actuators associated with these devices may have different respective frequency responses and available amplitudes of vibration. Therefore in example arrangements to be discussed below the haptic generator can be responsive to attributes defining one or capabilities of the haptic interface. In some examples, an attribute defines a frequency response of the haptic interface. In some examples, an attribute defines a maximum amplitude which may be represented by the haptic interface.

Figure 7:
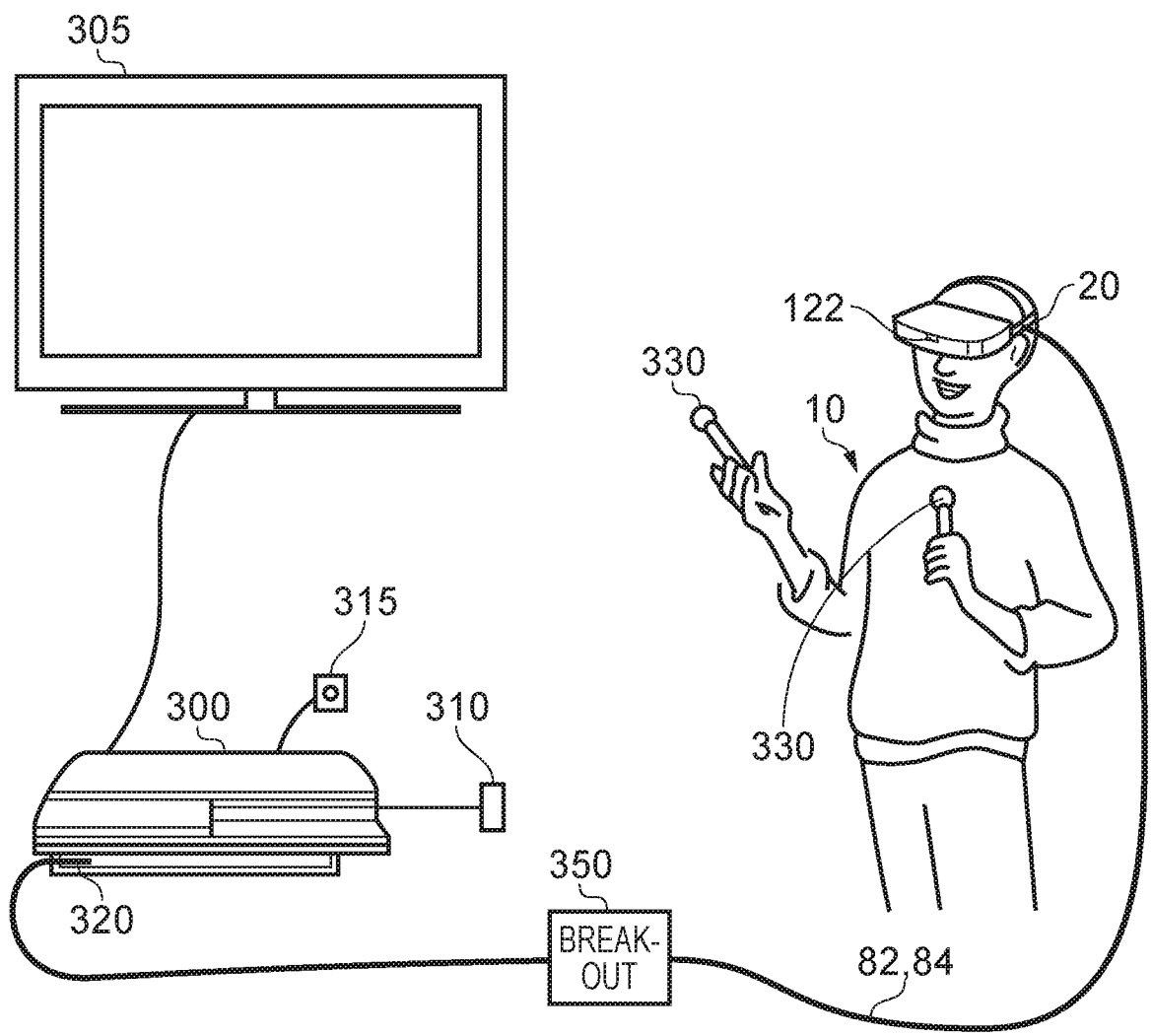

FIG. 7 schematically illustrates a similar arrangement (another example of a virtual reality system) in which the games console is connected (by a wired or wireless link) to a so-called "break out box" acting as a base or intermediate device 350, to which the HMD 20 is connected by a cabled link 82, 84. The breakout box has various functions in this regard. One function is to provide a location, near to the user, for some user controls relating to the operation of the HMD, such as (for example) one or more of a power control, a brightness control, an input source selector, a volume control and the like. Another function is to provide a local power supply for the HMD (if one is needed according to the embodiment being discussed). Another function is to provide a local cable anchoring point. In this last function, it is not envisaged that the break-out box 350 is fixed to the ground or to a piece of furniture, but rather than having a very long trailing cable from the games console 300, the break-out box provides a locally weighted point so that the cable 82, 84 linking the HMD 20 to the break-out box will tend to move around the position of the break-out box. This can improve user safety and comfort by avoiding the use of very long trailing cables.

In FIG. 7, the user is also shown holding a pair of hand-held controller 330s which may be, for example, Sony® Move® controllers which communicate wirelessly with the games console 300 to control (or to contribute to the control of) game operations relating to a currently executed game program. The user may also be wearing one or two haptic gloves as discussed in connection with FIG. 6.

It will be appreciated that the localisation of processing in the various techniques described in this application can be varied without changing the overall effect, given that an HMD may form part of a set or cohort of interconnected devices (that is to say, interconnected for the purposes of data or signal transfer, but not necessarily connected by a physical cable). So, processing which is described as taking place "at" one device, such as at the HMD, could be devolved to another device such as the games console (base device) or the break-out box. Processing tasks can be shared amongst devices. Source signals, on which the processing is to take place, could be distributed to another device, or the processing results from the processing of those source signals could be sent to another device, as required. So any references to processing taking place at a particular device should be understood in this context. Similarly, where an interaction between two devices is basically symmetrical, for example where a camera or sensor on one device detects a signal or feature of the other device, it will be understood that unless the context prohibits this, the two devices could be interchanged without any loss of functionality.

As mentioned above, in some uses of the HMD, such as those associated with virtual reality (VR) or augmented reality (AR) systems, the user's viewpoint needs to track movements with respect to a real or virtual space in which the user is located.

This tracking is carried out by detecting motion of the HMD and varying the apparent viewpoint of the displayed images so that the apparent viewpoint tracks the motion.

Figure 8:
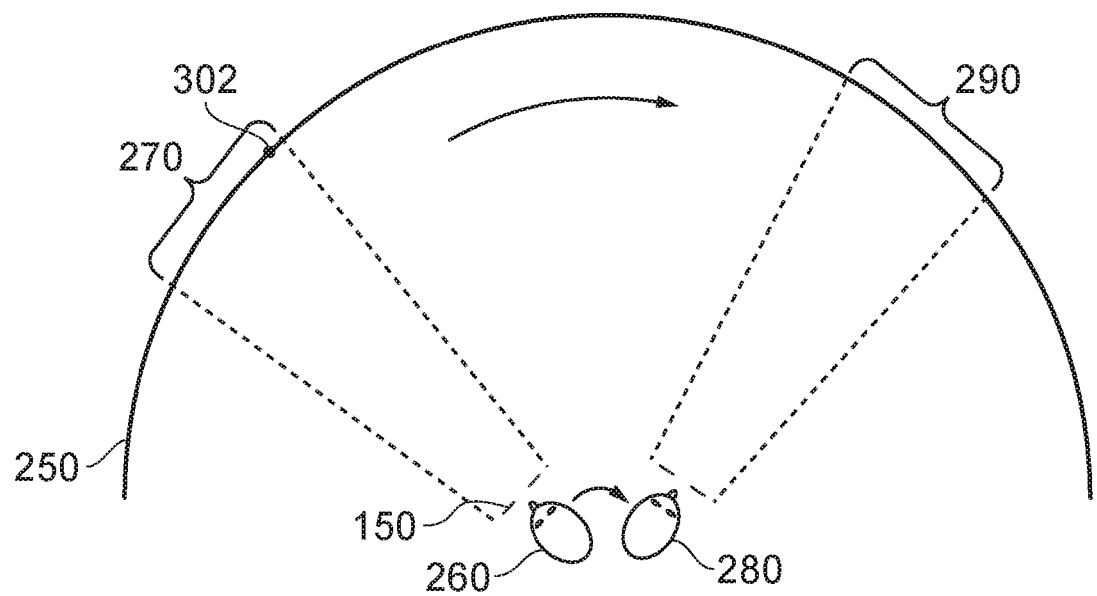
FIG. 8 schematically illustrates a change of view of user of an HMD.

FIG. 8 schematically illustrates the effect of a user head movement in a VR or AR system.

Referring to FIG. 8, a virtual environment is represented by a (virtual) spherical shell 250 around a user. This provides an example of a virtual display screen (VDS). Because of the need to represent this arrangement on a two-dimensional paper drawing, the shell is represented by a part of a circle, at a distance from the user equivalent to the separation of the displayed virtual image from the user. A user is initially at a first position 260 and is directed towards a portion 270 of the virtual environment. It is this portion 270 which is represented in the images displayed on the display elements 150 of the user's HMD. It can be seen from the drawing that the VDS subsists in three dimensional space (in a virtual sense) around the position in space of the HMD wearer, such that the HMD wearer sees a current portion of VDS according to the HMD orientation.

Consider the situation in which the user then moves his head to a new position and/or orientation 280. In order to maintain the correct sense of the virtual reality or augmented reality display, the displayed portion of the virtual environment also moves so that, at the end of the movement, a new portion 290 is displayed by the HMD.

So, in this arrangement, the apparent viewpoint within the virtual environment moves with the head movement. If the head rotates to the right side, for example, as shown in FIG. 8, the apparent viewpoint also moves to the right from the user's point of view. If the situation is considered from the aspect of a displayed object, such as a displayed object 300, this will effectively move in the opposite direction to the head movement. So, if the head movement is to the right, the apparent viewpoint moves to the right but an object such as the displayed object 300 which is stationary in the virtual environment will move towards the left of the displayed image and eventually will disappear off the left-hand side of the displayed image, for the simple reason that the displayed portion of the virtual environment has moved to the right whereas the displayed object 300 has not moved in the virtual environment.

Figure 2:
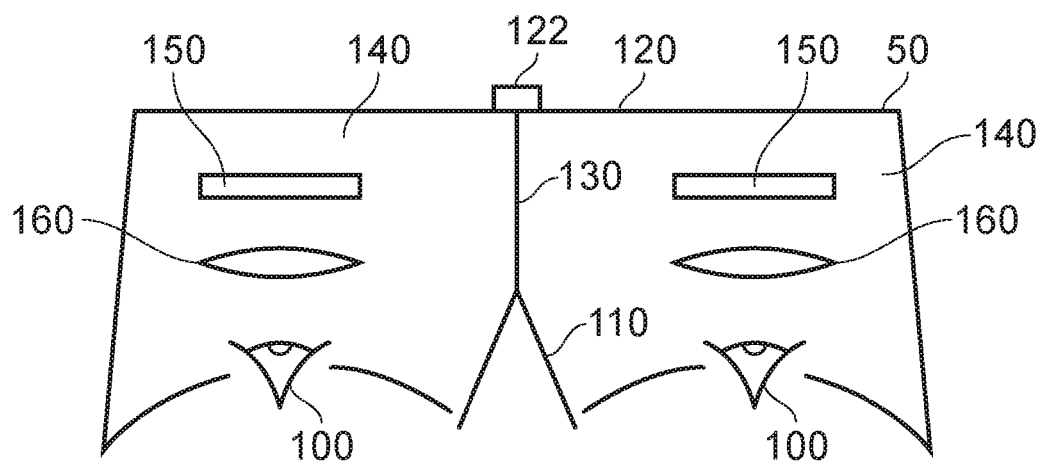
FIG. 2 is a schematic plan view of an HMD.
Figure 9A:
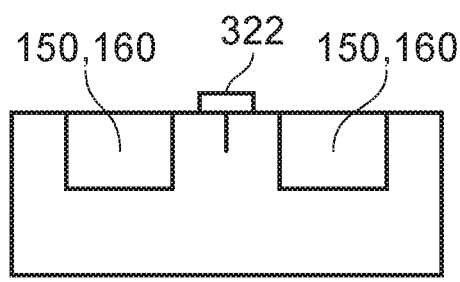
FIGS. 9a and 9b schematically illustrate HMDs with motion sensing.
Figure 9B:
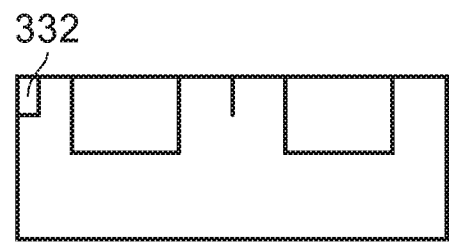

FIGS. 9a and 9b schematically illustrated HMDs with motion sensing. The two drawings are in a similar format to that shown in FIG. 2. That is to say, the drawings are schematic plan views of an HMD, in which the display element 150 and optical elements 160 are represented by a simple box shape. Many features of FIG. 2 are not shown, for clarity of the diagrams. Both drawings show examples of HMDs with a motion detector for detecting motion of the observer's head.

In FIG. 9a, a forward-facing camera 322 is provided on the front of the HMD. This may be the same camera as the camera 122 discussed above, or may be an additional camera. This does not necessarily provide images for display to the user (although it could do so in an augmented reality arrangement). Instead, its primary purpose in the present embodiments is to allow motion sensing. A technique for using images captured by the camera 322 for motion sensing will be described below in connection with FIG. 10. In these arrangements, the motion detector comprises a camera mounted so as to move with the frame; and an image comparator operable to compare successive images captured by the camera so as to detect inter-image motion.

FIG. 9b makes use of a hardware motion detector 332. This can be mounted anywhere within or on the HMD. Examples of suitable hardware motion detectors are piezoelectric accelerometers or optical fibre gyroscopes. It will of course be appreciated that both hardware motion detection and camera-based motion detection can be used in the same device, in which case one sensing arrangement could be used as a backup when the other one is unavailable, or one sensing arrangement (such as the camera) could provide data for changing the apparent viewpoint of the displayed images, whereas the other (such as an accelerometer) could provide data for image stabilisation.

Figure 10:
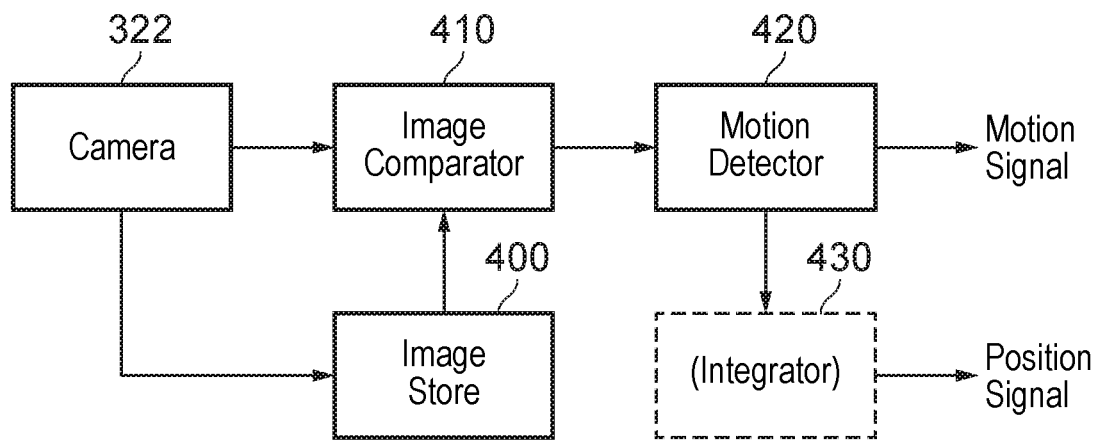
FIG. 10 schematically illustrates a position sensor based on optical flow detection.

FIG. 10 schematically illustrates one example of motion detection using the camera 322 of FIG. 9a.

The camera 322 is a video camera, capturing images at an image capture rate of, for example, 25 images per second. As each image is captured, it is passed to an image store 400 for storage and is also compared, by an image comparator 410, with a preceding image retrieved from the image store. The comparison uses known block matching techniques (so-called "optical flow" detection) to establish whether substantially the whole image has moved since the time at which the preceding image was captured. Localised motion might indicate moving objects within the field of view of the camera 322, but global motion of substantially the whole image would tend to indicate motion of the camera rather than of individual features in the captured scene, and in the present case because the camera is mounted on the HMD, motion of the camera corresponds to motion of the HMD and in turn to motion of the user's head.

The displacement between one image and the next, as detected by the image comparator 410, is converted to a signal indicative of motion by a motion detector 420. If required, the motion signal is converted by to a position signal by an integrator 430.

Alternatively or in addition, absolute tracking of feature points may be used when analysing images captured from a camera mounted on the HMD. Hence for example light emitting diodes or other static image features (including a TV screen for example) may be identified as features and tracked (for example using sub-pixel positions of LED's in the image) to calculate movement of the HMD with respect to these feature points.

Alternatively or in addition, a separate fixed camera 315 may monitor the HMD, which may comprise LEDs or similar light sources itself (see FIGS. 13 and 14, discussed later herein). Video images from this fixed camera may be analysed for absolute tracking of feature points (for example using sub-pixel positions of LED's on the HMD) to calculate motion of the HMD.

As mentioned above, as an alternative to, or in addition to, the detection of motion by detecting inter-image motion between images captured by a video camera associated with the HMD, the HMD can detect head motion using a mechanical or solid state detector 332 such as an accelerometer. This can in fact give a faster response in respect of the indication of motion, given that the response time of the video-based system is at best the reciprocal of the image capture rate. In some instances, therefore, the detector 332 can be better suited for use with higher frequency motion detection. However, in other instances, for example if a high image rate camera is used (such as a 200 Hz capture rate camera), a camera-based system may be more appropriate. In terms of FIG. 10, the detector 332 could take the place of the camera 322, the image store 400 and the comparator 410, so as to provide an input directly to the motion detector 420. Or the detector 332 could take the place of the motion detector 420 as well, directly providing an output signal indicative of physical motion.

Other position or motion detecting techniques are of course possible. For example, a mechanical arrangement by which the HMD is linked by a moveable pantograph arm to a fixed point (for example, on a data processing device or on a piece of furniture) may be used, with position and orientation sensors detecting changes in the deflection of the pantograph arm. In other embodiments, a system of one or more transmitters and receivers, mounted on the HMD and on a fixed point, can be used to allow detection of the position and orientation of the HMD by triangulation techniques. For example, the HMD could carry one or more directional transmitters, and an array of receivers associated with known or fixed points could detect the relative signals from the one or more transmitters. Or the transmitters could be fixed and the receivers could be on the HMD. Examples of transmitters and receivers include infra-red transducers, ultrasonic transducers and radio frequency transducers. The radio frequency transducers could have a dual purpose, in that they could also form part of a radio frequency data link to and/or from the HMD, such as a Bluetooth® link.

Figure 11:
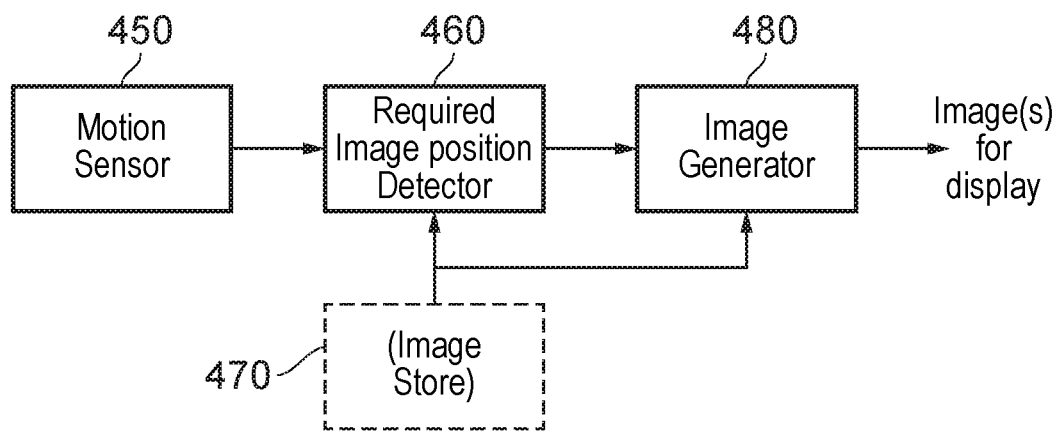
FIG. 11 schematically illustrates image processing carried out in response to a detected position or change in position of an HMD.

FIG. 11 schematically illustrates image processing carried out in response to a detected position or change in position of the HMD.

As mentioned above in connection with FIG. 10, in some applications such as virtual reality and augmented reality arrangements, the apparent viewpoint of the video being displayed to the user of the HMD is changed in response to a change in actual position or orientation of the user's head.

With reference to FIG. 11, this is achieved by a motion sensor 450 (such as the arrangement of FIG. 10 and/or the motion detector 332 of FIG. 9b) supplying data indicative of motion and/or current position to a required image position detector 460, which translates the actual position of the HMD into data defining the required image for display. An image generator 480 accesses image data stored in an image store 470 if required, and generates the required images from the appropriate viewpoint for display by the HMD. The external video signal source can provide the functionality of the image generator 480 and act as a controller to compensate for the lower frequency component of motion of the observer's head by changing the viewpoint of the displayed image so as to move the displayed image in the opposite direction to that of the detected motion so as to change the apparent viewpoint of the observer in the direction of the detected motion.

A device such as an HMD or a handheld controller may have a surface upon which one or more optically detectable markers are disposed so that detection of the markers allows the device to be tracked. For example, a device such as an HMD can be provided which has one or more optically detectable markers, each optically detectable marker comprising a plurality of predetermined elements (e.g. LEDs, coloured shapes, a logo or a combination thereof) arranged on a surface of the device. One or more cameras facing the device can be used to capture images of the optically detectable markers. Image analysis can be performed to detect a position of an optically detectable marker with respect to the position of each of the cameras to allow tracking of the device with respect to the cameras based on an analysis of successive images. Similarly, an HMD may comprise one or more cameras which can capture images of optically detectable markers disposed on another device such as a games console or a television. In this case, the images captured by the one or more cameras mounted on the HMD can be used to detect a position of an optically detectable marker with respect to the position of each of the cameras to allow tracking of the HMD.

Figure 12:
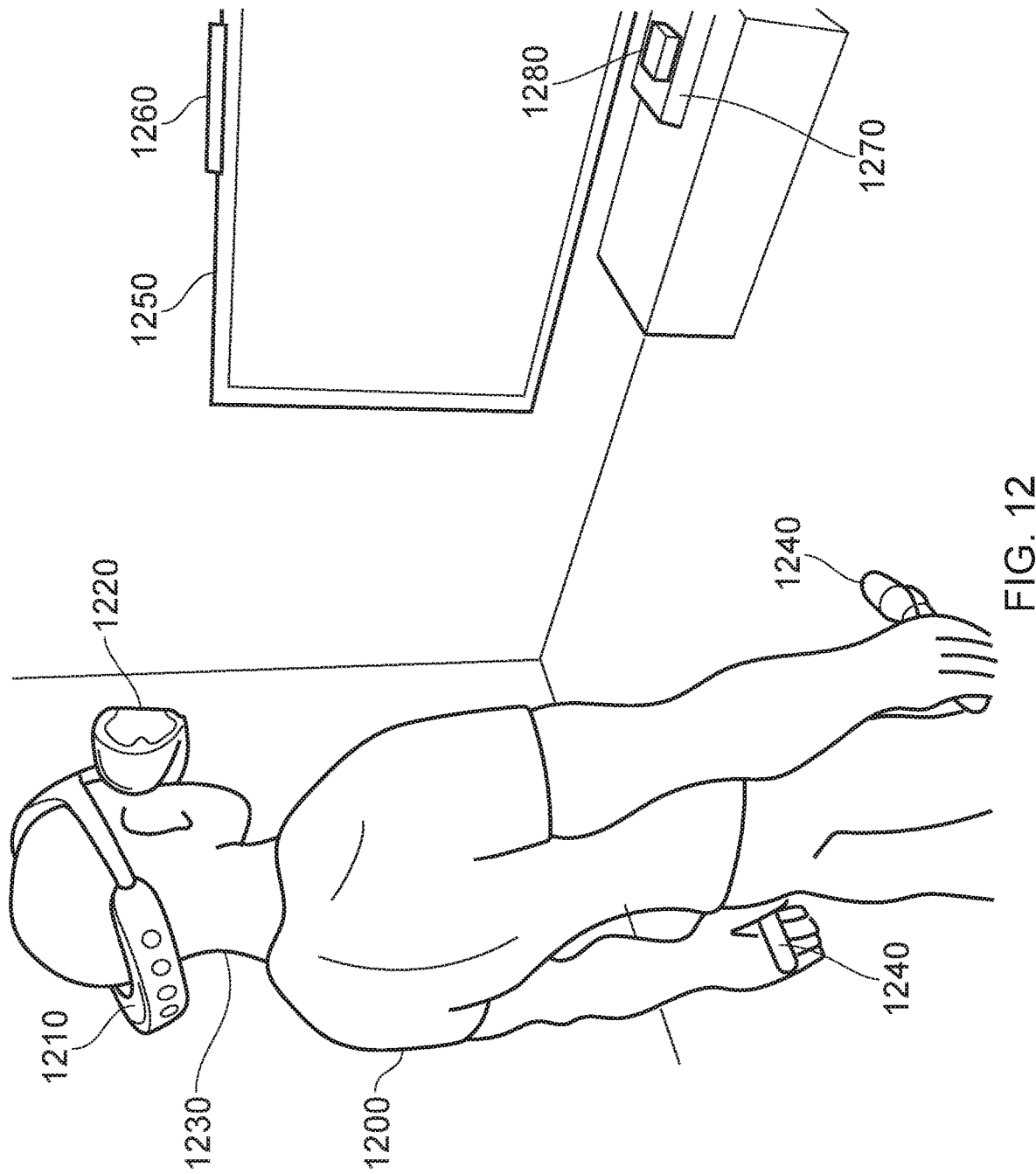
FIG. 12 schematically illustrates a user wearing an HMD and engaged in a video game.

FIG. 12 schematically illustrates a user wearing an HMD and engaged in a video game. In many respects, the arrangement of FIG. 12 is similar to that of FIG. 7 discussed above, but for clarity of the diagram the cabled connections 82, 84 and the optional break-out box 350 of FIG. 7 are not shown. However, FIG. 12 does illustrate an example of the relative positioning of the user and other components in normal operation.

In FIG. 12, the user 1200 is wearing an HMD 1210 having one or more optically detectable markers 1220 at the front of the HMD (where the term "front" is relative to an orientation of the user's head) and one or more optically detectable markers 1230 at the rear of the HMD, for example, on a head strap. The user carries a hand held controller 1240 in each hand (in this example). The user is facing a television screen 1250. Of course, it is recognised that when the user is wearing the HMD 1210, the user does not himself observe the television screen. However, facing the television screen provides a natural orientation to other components of the apparatus. The television screen may, as discussed above, provide a so-called "social screen" representing images indicative of game action being played by the user 1200, for the enjoyment of other nearby people who are not wearing HMDs.

Situated around the television screen are a light bar 1260, to be discussed below, a games console 1270 and at least one image capture unit 1280.

The image capture unit 1280 may comprise a plurality of cameras arranged with respect to each other according to a predetermined configuration. The image capture unit 1280 may comprise a plurality of cameras where the position and orientation of each camera is known and information indicative of the relative positions and orientations is stored for use in defining a relationship between the respective cameras. In this case, knowledge of the predetermined configuration of the plurality of cameras allows the coordinate system of one camera to be mapped with respect to a coordinate system of another camera so that the images captured by the respective cameras can be used together to track a single marker. Each camera of the image capture unit 1280 can be configured to capture successive images and to detect a current location of one or more elements in the captured images with respect to a coordinate system of the camera.

In operation, one or more of the devices (namely the HMD 1210, the console 1270 and the hand-held controllers 1240) have at least one camera and using the camera, the devices detect the positions (or at least the relative positions) of other ones of the devices by means of detecting markers in captured images. The HMD 1210 may comprise a plurality of cameras arranged with respect to each other according to a predetermined configuration. Each camera mounted on the HMD 1210 can be configured to capture successive images and to detect a current location of one or more elements in the captured images with respect to a coordinate system of the camera. For example, the HMD may comprise a first camera and a second camera mounted with respect to each other having at least partially overlapping fields of view, so as to capture images of a three-dimensional space in-front of the HMD within the game playing area or to the rear of the HMD within the game playing area.

To assist with tracking of the HMD by a camera provided as part of the image capture unit 1280, for example, the HMD comprises front and rear markers as discussed. The light bar 1260 can provide an optically detectable marker indicating a location of or relative to the television screen console, and the hand-held controllers 1240 can provide respective optically detectable markers. Other devices (for example, a second HMD worn by another user, and/or one or more other peripheral devices) can also detect the relative position of devices shown in FIG. 12 and also be detected by those devices. In some examples, the devices share the data defining the relative positions of other devices, as detected using the respective cameras, so that collectively, or via a master device such as the console 1270 handling the collection and amalgamation of the position data, a map or specification of the positions within the game playing area of each of the devices can be derived based on their respective relative position detections.

Figure 13:
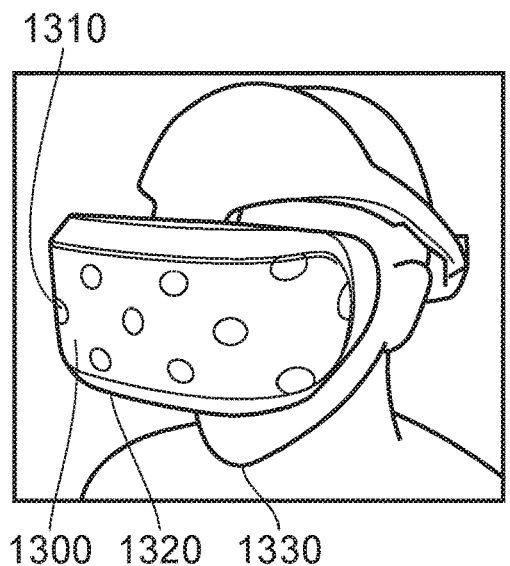
FIGS. 13 and 14 are respective front and rear schematic views of an HMD.

In FIG. 13, the front surface 1300 of the HMD worn by the user has one or more optically detectable markers comprising a plurality of predetermined elements 1310 (LEDs or other light emitting portions, electrically illuminated portions, or passive features 1310) disposed so that those features can be detected by one or more cameras, such as the image capture unit 1280, directed towards the HMD. The elements 1310 can collectively be considered as a single optically detectable marker. A reason for having multiple elements is to assist in distinguishing the optically detectable marker from other image features in the captured images. Also, having multiple elements allows an estimation of the separation distance from the camera to the detected marker, in that the distance (in the captured images) between the predetermined elements 1310 will be smaller for a more distant HMD (with respect to the camera capturing the images) and larger for a closer HMD. In this way, the optically dateable marker comprises two or more spatially separated marker portions; and the detector is configured to detect respective image locations of images of the marker portions (predetermined elements) in the given captured image.

Figure 14:
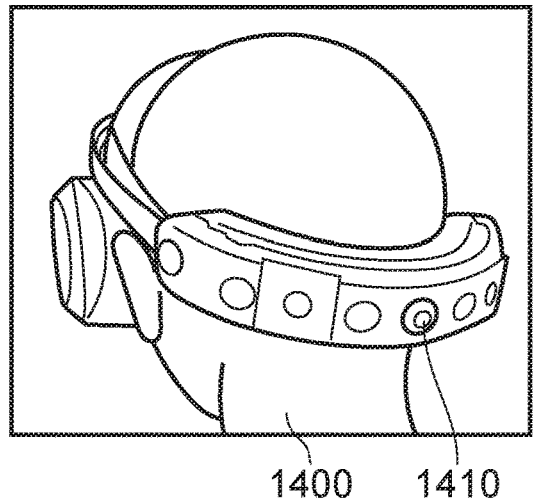

FIG. 14 schematically illustrates a rear view of the HMD in which a further optically detectable marker comprising a plurality of elements 1400 is provided. So, if the user turns his back on the console and its associated camera, or if other peripheral devices are disposed behind the user in use, the location of the HMD can still be optically detected using a camera.

Figure 15:
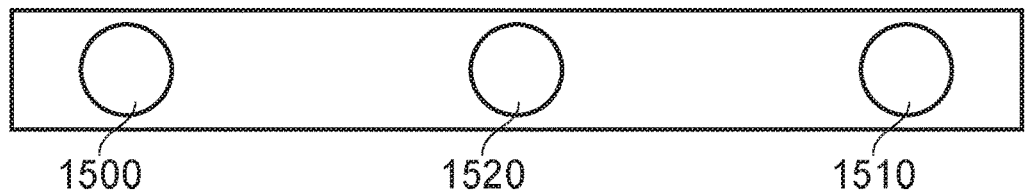
FIG. 15 schematically illustrates a light bar.

FIG. 15 schematically illustrates a light bar of the type shown in FIG. 12, having an optically detectable marker comprising elements 1500, 1510 (such as LEDs or other electrically illuminable elements). A further LED or indicator 1520 can be provided, for example to give timing information to the other devices in the system. By transmitting (for example) an encoded stream of optical pulses using the LED 1520, the optical position detections by other devices in the overall apparatus can be synchronised to a common time frame specified by the console. By positioning the LED 1520 between the marker portions 1500, 1510, its location can be inferred in a captured image even when the LED 1520 is not currently illuminated. So, a pattern of illumination and non-illumination can be detected for the LED 1520 by virtue of its location relative to the marker portions 1500, 1510. Therefore, in examples, an optically detectable indicator (the indicator 1520) comprises an electrically illuminable element such as a light emitting diode.

Figure 16:
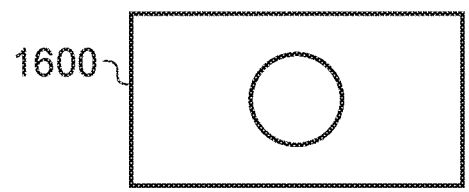
FIG. 16 schematically illustrates an image capture unit.

FIG. 16 schematically illustrates an image capture unit 1600. As discussed previously, the image capture unit 1600 may comprise a plurality of cameras arranged with respect to each other according to a predetermined configuration. As in the example of FIG. 12, the image capture unit 1600 may be positioned close to the position of the console. For example, the image capture unit 1600 may comprise a plurality of cameras mounted on a frame of the display unit 1250 illustrated in FIG. 12. In this configuration the plurality of cameras can be configured to capture images of the one or more elements provided on the surface of the HMD 1210 or the hand held controller 1240 when the user is located as shown in FIG. 12. Alternatively, the image capture unit 1600 may be provided as part of an HMD. In this configuration the plurality of cameras can be configured to capture images of the one or more elements provided by the light bar for example. In some examples, the image capture unit 1600 may comprise a stereoscopic camera so that depth information can be derived for an image feature, such as an optically detectable marker or an individual predetermined element 1310, based on a relative displacement of the feature included in a stereoscopic image.

Figure 17:
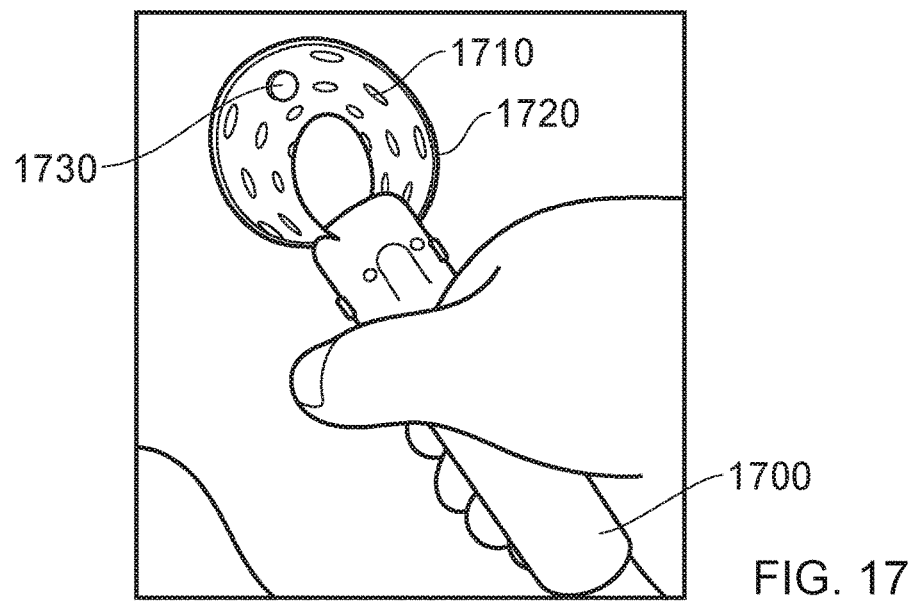
FIG. 17 schematically illustrates a hand-held controller.

FIG. 17 schematically illustrates a hand-held controller 1700 having an optically detectable marker 1710 formed of a plurality of elements 1720 disposed at its distal end. A camera 1730 may also be provided as part of the hand-held controller 1700.

So, each of the devices shown in FIG. 12 may provide an optically detectable marker having a plurality of elements. A camera can be used to capture images of the elements to detect locations of the elements with respect to the coordinate system of the camera.

As discussed previously, an analysis of images captured by a camera can be used to detect a location of one or more elements with respect to a coordinate system of the camera; using a camera model defining a relationship between locations in three-dimensional space and points in a captured image, a captured image including an element can allow a detection of the location of that element with respect to the coordinate system of the camera. The camera model therefore allows a mapping between a three-dimensional space associated with the camera's coordinate system and pixel coordinates in an image frame captured by the camera.

The camera model used for mapping the three-dimensional space to the image frame captured by the camera is dependent upon a number of parameters. The parameters which define the relationship between the coordinate system for the camera and the points in a captured image include both camera intrinsic parameters and camera extrinsic parameters, which are dependent upon properties associated with the camera, including: focal length; principal point; scale factor; camera position; and camera orientation. Alterations to these properties may occur for a variety of different reasons, such as mechanical stress or temperature variations, which may give rise to a drift associated with the camera model. As a result of variations associated with the parameters of the camera model, a detection of a location in the three-dimensional space according to the camera model may be subject to drift. This can be particularly problematic when using a plurality of respective cameras to detect locations of a given object, because the respective cameras may be subject to differing degrees of camera model variation resulting in discontinuities in detected locations of an element. This can be particularly problematic when using a combination of detection results from respective cameras, such as when transitioning from one camera to another.

The operations to be discussed below relate to capturing images of one or more elements using a plurality of cameras and detecting locations of the elements with respect to a common camera coordinate system. The description which follows concerns example techniques for generating camera-to-camera mappings between respective cameras according to a common camera coordinate system.

Figure 18:
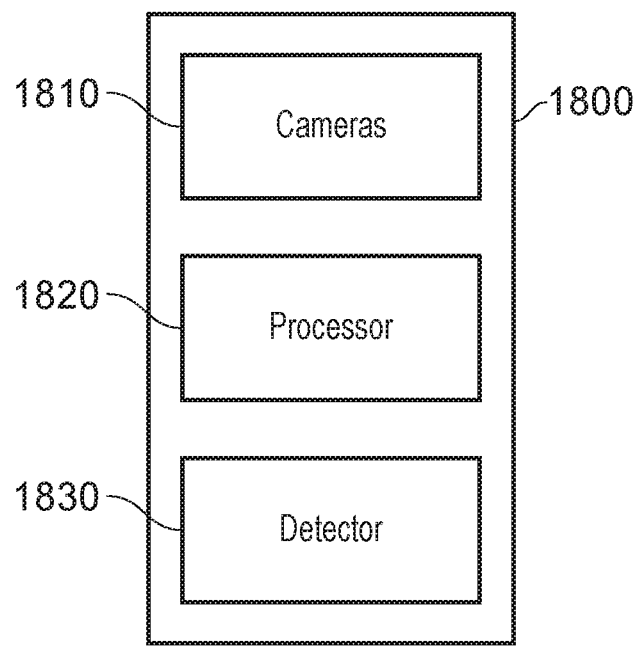
FIG. 18 schematically illustrates a data processing apparatus for generating data for a common camera coordinate system.

FIG. 18 schematically illustrates a data processing apparatus 1800 for generating camera mapping data for a common camera coordinate system. In embodiments of the disclosure, the data processing apparatus 1800 comprises: a plurality of cameras 1810 arranged according to a predetermined configuration, wherein each camera is configured to capture successive images and to detect a current location of one or more elements in the captured images with respect to a coordinate system of the camera; a processor 1820 to generate a common camera coordinate system in dependence upon the respective coordinate systems of the plurality of cameras, the common camera coordinate system comprising a set of locations in a three-dimensional space included within the field of view of the plurality of cameras; and a detector 1830 to detect a current location of a given element with respect to the common camera coordinate system based on images captured by the plurality of cameras, wherein for each camera, the processor is configured, in response to a detection by the detector that the current location of the given element corresponds to a location in the set of locations of the common camera coordinate system, to generate first data for that location in the set of locations indicative of a mapping between the coordinate system for the camera and the common camera coordinate system, and wherein in response to a detection of a location in the set of locations for which the first data is indicative of the mapping for two or more cameras with respect to the common camera coordinate system, the processor is configured to generate second data for that location indicative of a mapping between the coordinate systems for the two or more cameras.

In this context, the data processing apparatus 1800 may be provided as part of an HMD a break-out box, a games console, a general purpose computing device, a peripheral device or the like. The data processing device 1800 comprises the plurality of cameras 1810 arranged with respect to each other according to a known configuration. The relative position and orientation of each camera is known and data indicative of the relative positions and orientations of the plurality of cameras can be stored for use in defining a geometric relationship between the respective cameras and the coordinate systems of the respective cameras.

Each camera is configured to capture successive images of the three-dimensional space (real world environment) included within the camera's field of view. Each camera has its own coordinate system defined in dependence upon the position and orientation of the camera. A current location of an element, included in an image captured by a camera, with respect to the coordinate system of the camera can be detected based on an analysis of the images captured by the camera. In this way, data indicative of the location of the element with respect to the camera can be generated for the camera coordinate system. As such, for the case where the same element is observed by two cameras, the first camera can generate data indicative of the location of the element with respect to the first camera based on the first camera coordinate system, and the second camera can generate data indicative of the location of the element with respect to the second camera based on the second camera coordinate system. The coordinate system for each camera comprises a set of locations corresponding to the locations in the three-dimensional space within the field of view of the camera.

The plurality of cameras 1810 can be arranged according to any predetermined configuration, where a field of view associated with one camera of the plurality of cameras 1810 at least partially overlaps with a field of view of another camera of the plurality of cameras 1810. In other words, the plurality of cameras 1810 are configured so that each camera has a fixed position and orientation with respect to another camera and at least two cameras are configured to capture images of a same portion of the three-dimensional space. The plurality of cameras 1810 may be mounted on the HMD 1210 or mounted proximate to the game console 1270, as discussed previously. Alternatively, the plurality of cameras may be arranged according to a predetermined configuration so that the respective cameras are located anywhere within a three-dimensional space, such as user's home environment illustrated in FIG. 12, where at least two cameras have at least partially overlapping fields of view. A first camera may be arranged according to a first position and orientation, and a second camera may be arranged according to a second position and orientation, where at least a portion of a field of view of the first camera corresponds to a portion of a field of view of the second camera. In this way, certain locations in three-dimensional space can be observed by two or more cameras.

The processor 1820 is configured to generate the common camera coordinate system in dependence upon the respective coordinate systems of the plurality of cameras 1810. Since each camera has a camera coordinate system defined in dependence upon the position and orientation of the camera, and the plurality of cameras are arranged according to the predetermined configuration such that the relative positions and orientations of each of the cameras is known, the processor can generate the common camera coordinate system which represents a combination of the respective coordinate systems corresponding to the respective cameras. In this way, the common camera coordinate system can be generated which represents the three-dimensional space included within the field of view of the plurality of cameras, wherein at least a portion of the common camera coordinate system is generated by combining the coordinate systems of two or more cameras of the plurality of cameras having partially overlapping fields of view.

In some examples, data indicative of the predetermined configuration of the plurality of cameras comprising the relative positions and orientations of each of the cameras may be acquired by the processor 1820. For example, each camera may comprise a motion sensor for generating data indicative of a current position and orientation of the camera (examples of suitable hardware motion detectors are piezoelectric accelerometers or optical fibre gyroscopes). Using the data indicative of the predetermined configuration the processor 1820 can generate the common camera coordinate system representing the three-dimensional space that is within the field of view of the plurality of cameras. The respective cameras may be disposed at different locations within the three-dimensional space and data indicative of the known configuration can be acquired by the data processing apparatus 1800 for generating the common camera coordinate system.

Figure 19A:
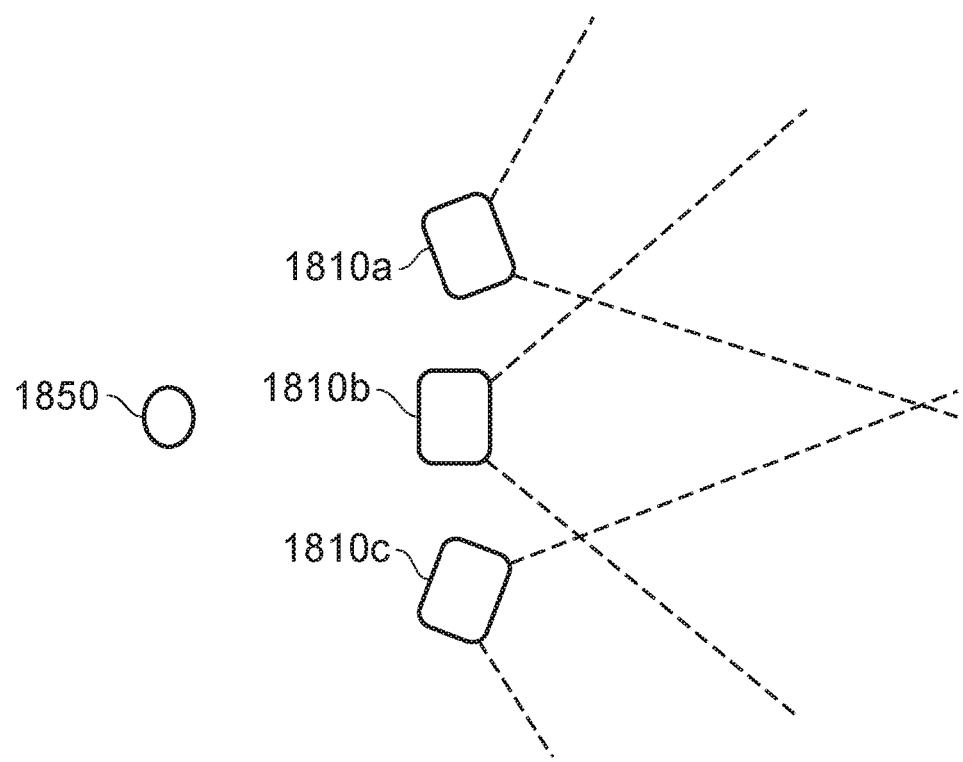
FIG. 19a schematically illustrates an example of cameras arranged according to a predetermined configuration.

FIG. 19a schematically illustrates an example of a plurality of cameras arranged according to a predetermined configuration. It will be appreciated that this illustration provides a non-limiting example and that the same techniques are applicable for the case where there are just two cameras having partially overlapping field of views, or N cameras having partially overlapping field of views (N≥2). In the example shown, three respective cameras 1810a, 1810b, 1810c are shown where the dashed lines represent a field of view associated with each of the cameras. As can be seen in FIG. 19a, the field of view for the camera 1810a partially overlaps with the field of view for the camera 1810b. Similarly, the field of view for the camera 1810b partially overlaps with the field of view for the camera 1810c. Therefore, for the case where an element moves within the three-dimensional space included within the field of view of the cameras 1810a-c, the location of the element can be tracked by each of the cameras based on whether the element is included in the field of view of the camera. Hence, a transition between the respective cameras can be used to track the element in the three-dimensional space and for portions of the three-dimensional space where the fields of view of the cameras overlap the current location of the same element can be detected with respect to the common camera coordinate system using images captured by two or more cameras.

However, for the case where the camera intrinsic and extrinsic parameters associated with the camera models used by the respective cameras are subject to differing degrees of variation, the variations may cause discontinuities when transitioning from one camera to another. Specifically, whilst the respective camera coordinate systems can be initially mapped with respect to each other according to the predetermined configuration, the camera models used by each camera may be subject to time-dependent variations (e.g. time-based drift) due to external factors and therefore the relationships between the respective cameras may vary over time.

The common camera coordinate system can be generated by the processor 1820 based on the predetermined configuration of the respective camera coordinate systems such that the common camera coordinate system represents a combination of the respective coordinate systems corresponding to the respective cameras. In the example shown in FIG. 19a, a position of the common camera 1850 associated with the common camera coordinate system generated for the plurality of cameras 1810a, 1810b, 1810c is shown for illustrative purposes. The common camera 1850 has a common camera coordinate system comprising a set of locations in the three-dimensional space included within the field of view of the plurality of cameras 1810a, 1810b, 1810c.

Figure 19B:
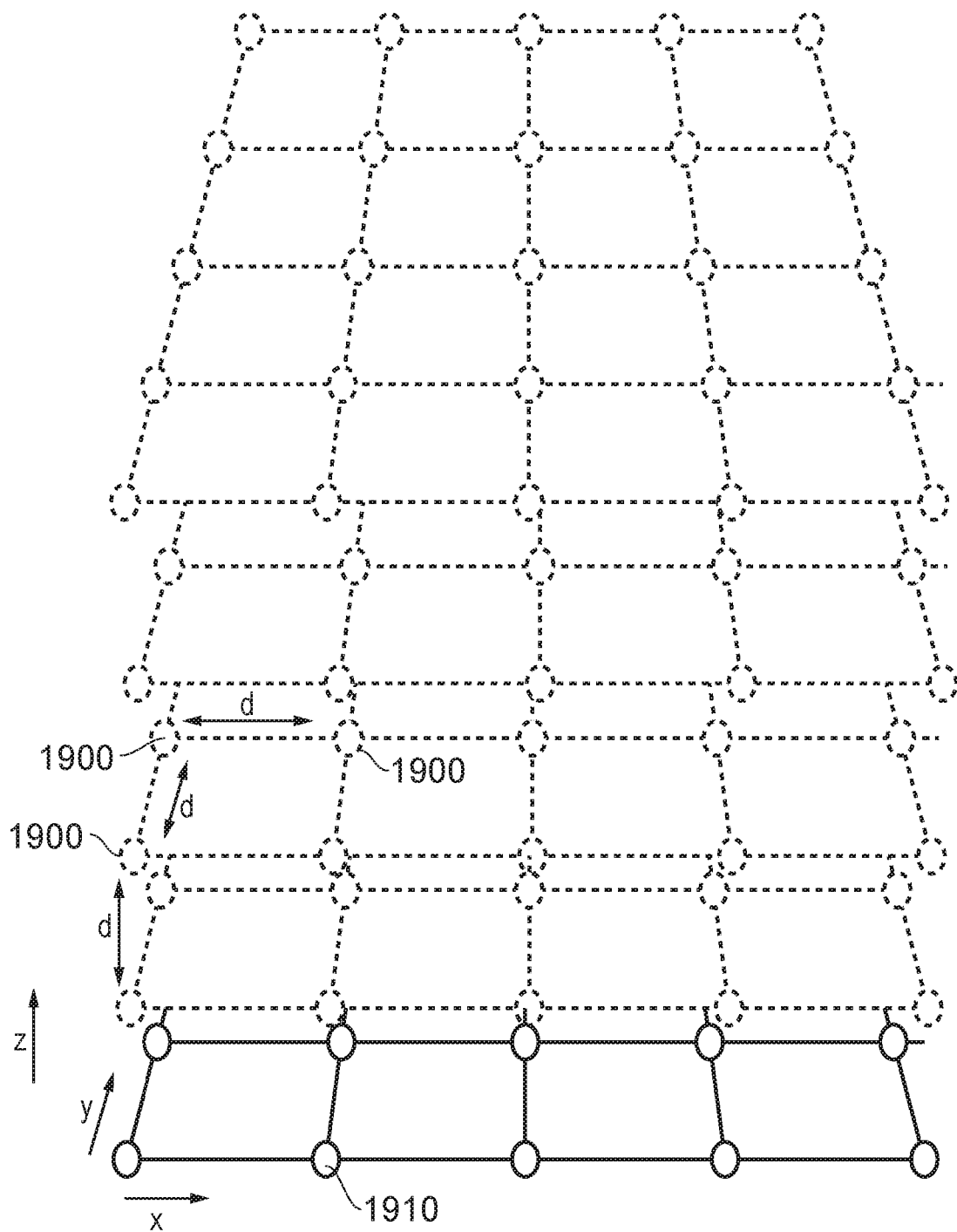
FIG. 19b schematically illustrates a set of locations in physical space.

FIG. 19b schematically illustrates the common camera coordinate system comprising a three dimensional array or grid of locations 1900 in three-dimensional (physical) space, for example being separated by a distance d in the (x, y, z) directions (though different respective separations could define the array for one or more axes, and the array locations do not need to be evenly spaced). The z direction may be a depth parameter (away from the common camera making the observation) and the x and y axes may be two perpendicular axes in a plane of constant z.

The common camera coordinate system comprising the three-dimensional array of locations (a set of locations) 1900 can be generated for the three-dimensional space observed by the plurality of cameras 1810. Images captured by each camera of the plurality of cameras 1800 can be used to detect a current location of a given element with respect to a given camera and data can thus be generated indicative of the current location with respect to the coordinate system of the given camera.

Based on the predetermined configuration indicating the mapping between the coordinate system of the given camera and the common camera coordinate system, the detector 1830 can use the data indicative of the current location of the given element with respect to the coordinate system of the given camera to detect the current location of the given element with respect to the common camera coordinate system. In this way, the detector 1830 can detect a current location of a given element with respect to the common camera coordinate system based on images captured by any camera of the plurality of cameras.

For each camera, the processor 1820 is configured, in response to a detection by the detector 1820 that the current location of the given element corresponds to a location in the set of locations of the common camera coordinate system, to generate first data for that location in the set of locations indicative of a mapping between the coordinate system for the camera and the common camera coordinate system. In other words, a current location of an element with respect to the common camera coordinate system can be detected by the detector 1820 based on images captured by a camera, and when the current location corresponds to a location in the three-dimensional array of locations 1900 the processor can generate and store data for that location in the set of locations, where the data stored for that location is indicative of a mapping between the coordinate system for the camera and the common camera coordinate system.

An example will now be described with reference to the camera arrangement in FIG. 19a. For the case where a given element moves within the three-dimensional space and is observed by the camera 1810a, then the camera 1810b and then the camera 1810c, the first data will be generated by the processor 1820 for the locations in the set of locations 1900 visited by the given element. Specifically, for the one or more locations in the set of locations visited by the given element according to the detection performed by the detector 1830 using the images captured by the first camera 1810a, the processor 1820 is configured to generate the first data for those one or more locations, where for each of the one or more locations the first data is indicative of a mapping between the first camera's 1810a coordinate system and the common camera coordinate system. For the one or more locations in the set of locations visited by the given element according to the detection made by the detector 1830 using the images captured by the second camera 1810b, the processor 1820 is configured to generate the first data those one or more locations where the first data is indicative of a mapping between the second camera's 1810b coordinate system and the common camera coordinate system. For the one or more locations in the set of locations visited by the given element according to the detection made by the detector 1830 using the images captured by the third camera 1810c, the processor 1820 is configured to generate the first data those one or more locations where the first data is indicative of a mapping between the third camera's 1810c coordinate system and the common camera coordinate system.

In this way, the respective locations in the set of locations included in the common camera coordinate system can be populated with the first data according to whether a detection is made by the detector 1820 that the location in the set of locations corresponds to a current location of the given element. The camera mapping indicated by the first data generated for a given location in the set of locations is dependent upon which camera from the plurality of cameras is used by the detector 1830 to detect the current location corresponding to the given location in the set of locations.

As such, it is possible for first data indicative of the mapping between the first camera's 1810a coordinate system and the common camera coordinate system to be generated for any of the locations of the common camera coordinate system corresponding to locations within the field of view of the first camera 1810a. It is possible for first data indicative of the mapping between the second camera's 1810b coordinate system and the common camera coordinate system to be generated for any of the locations of the common camera coordinate system corresponding to locations within the field of view of the second camera 1810b. It is possible for first data indicative of the mapping between the third camera's 1810c coordinate system and the common camera coordinate system to be generated for any of the locations of the common camera coordinate system corresponding to locations within the field of view of the third camera 1810c.

As discussed previously, the plurality of cameras are arranged according to the predetermined configuration so that at least one camera of the plurality of cameras 1810 has a field of view that at least partially overlaps with a field of view of another camera of the plurality of cameras 1810. For example, for the case where the given element is located in the portion of the three-dimensional environment included within the field of view of both the camera 1810a and the camera 1810*b*, in response to the detection by the detector 1830 that the current location of the given element corresponds to a location in the set of locations based on images captured by both the first camera 1810*a* and the second camera 1810*b*, the processor 1820 is configured to generate the first data for that location, where the first data is indicative of the mapping between the common camera coordinate system and the coordinate system for the first camera 1810*a* and also the mapping between the common camera coordinate system and the coordinate system for the second camera 1810*b*. Therefore, for one or more locations in the set of locations corresponding to locations in the three-dimensional space within the field of view of the first camera 1810*a* and the second camera 1810*b*, the first data may comprise data indicative of the mappings for both the first camera 1810*a* and the second camera 1810*b* with respect to the common camera coordinate system. Similarly, as can be seen in the example arrangement illustrated FIG. 19*a*, for a location in the three-dimensional space that is within the field of view of the first camera 1810*a*, the second camera 1810*b*, and the third camera 1810*c* (shown at the right-hand side of FIG. 19*a*), the first data can be generated in response to a detection by the detector 1820 using images captured by the first, second and third cameras, where the first data is indicative of the mapping between each of the three cameras and the common camera coordinate system.

Hence more generally, for the case where N cameras are arranged to have at least partially overlapping fields of view, for a given location in the common camera coordinate system corresponding to the portion of there-dimensional space observed by the N cameras, the first data can be generated for that given location, the first data generated for that given location indicating a mapping between each of the N cameras and the common camera coordinate system.

Figure 20:
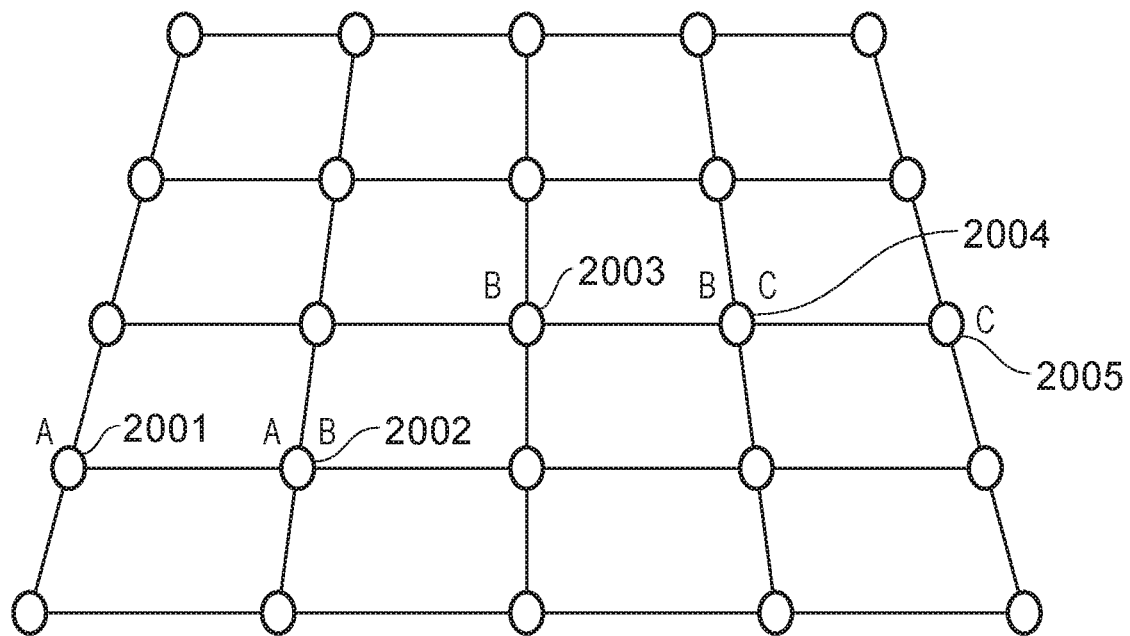
FIG. 20 schematically illustrates a set of locations for which data is generated.

FIG. 20 schematically illustrates a two-dimensional array of locations of the common camera coordinate system for which the first data is generated. For clarity of the diagram just one plane (in the z direction) of array locations has been shown. The locations for which the first data is indicative of the mapping for the first camera 1810*a* with respect to the common camera coordinate system are labelled with the letter "A". The locations for which the first data is indicative of the mapping for the second camera 1810*b* with respect to the common camera coordinate system are labelled with the letter "B". The locations for which the first data is indicative of the mapping for the third camera 1810*c* with respect to the common camera coordinate system are labelled with the letter "C". As shown, in FIG. 20, for the locations that have not been visited by the given element the first data has not been generated, whereas for locations that have been visited by the given element the first data has been generated and in some locations the first data has been generated using images captured by more than one camera. As such, FIG. 20 illustrates an example of a two-dimensional array of locations corresponding to one plane in the z direction and it will be appreciated that the first data can be generated for each of the planes in the Z direction in a manner similar to that illustrated in FIG. 20.

It will be appreciated that FIG. 20 provides an example of first data generated by the processor 1820 in response to a detection of a plurality of current locations 2001, 2002, 2003, 2004, 2005 of a given element by the detector 1830, and that depending on the movement of the given element with respect to the plurality of cameras the first data can be generated for any of the locations in the array of locations. The example current locations 2001, 2002, 2003, 2004, 2005 in FIG. 20 for which the first data is generated may for example correspond to tracking a movement of a given element from a location in the field of view of the camera 1810*a* shown in FIG. 19*a* to a location in the field of view of the camera 1810*c* using the three cameras.

In addition to generating the first data, the processor 1820 is configured generate second data for one or more locations in the array of locations of the common camera coordinate system, where the second data is indicative of a camera-to-camera mapping between the coordinate systems of two or more cameras. For a location in the set of locations (three-dimensional array of locations) for which the first data is generated, the processor 1820 is configured to detect when the first data for the location is indicative of a mapping for two or more cameras with respect to the common camera coordinate system. In response to a detection by the processor 1820 that the first data generated for, and stored in association with, a given location is indicative of a mapping for two or more cameras with respect to the common camera coordinate system, the processor 1820 is configured to generate the second data for the given location, the second data indicative of a mapping between the two or more cameras. As such, for the given location, the second data indicative of the camera-camera mapping for at least two cameras can be generated.

Hence, for example, for the location 2002 in FIG. 20 having the labels "A" and "B", the processor 1820 is configured to detect that the first data is indicative of the mapping for the first camera 1810*a* and the second camera 1810*b* with respect to the common camera coordinate system, and the processor 1820 is configured to generate the second data indicative of the camera-to-camera mapping for the first camera 1810*a* and the second camera 1810*b* in response to the detection. As such, for the location 2002, second data can be stored defining a camera-to-camera transform function for the transform between the first camera 1810*a* and the second camera 1810*b*. Similarly, at the location 2004 having the labels "B" and "C", the processor 1820 is configured to generate the second data indicative of the camera-to-camera mapping for the second camera 1810*b* and the third camera 1810*c*, such that the second data can be stored for the location 2004 defining a camera-to-camera transform function for the transform between the second camera 1810*b* and the third camera 1810*c*. In this way, the second data can be generated and stored for at least some of the locations in the set of locations of the common camera coordinate system.

By generating the second data in this manner, data indicative of camera-to-camera mapping for two or more cameras can be stored in association with locations in the common camera coordinate system. Therefore, for a given location, a mapping between two or more cameras of the plurality of cameras 1810 can be established based on the second data stored in association with that given location. For the case where the second data is initially generated for a given location, and then the given element subsequently visits the given location, the second data can be generated again and used to update the existing second data that is stored for that location. For example, a first instance of the second data may be generated at a time T1 and a second instance of the second data may be generated at a time T2. The camera-to-camera mapping indicated by the first instance can be combined (blended) with the camera-to-camera mapping indicated by the second instance for that location to refine the data stored for that location. In some examples, an interpolation of the first and second instances of the second data for the same location may be used to update the second data stored for the location. A liner interpolation ("lerp") of the positions and a spherical linear interpolation ("slerp") of the orientations associated with the camera-to-camera mappings for the first and second instances can be used to combine the two instances of the second data generated for a given location. In some examples, a weighting factor may also be used to combine the first and second instances of the second data according to a reliability associated with the detection used to generate the respective instances. In this way, the second data can be stored in association with any of the locations in the common camera coordinate system in a manner that allows the camera-to-camera mapping between two or more cameras for a given location to be updated based on detections performed at different times.

In embodiments of the disclosure, the processor 1820 is configured to generate the first data for each current location of the given element to generate the first data for at least a plurality of locations in the set of locations. The detector 1830 is configured to detect current locations of a given element of the one or more elements based on the images captured by any of the plurality of cameras. For each current location that is detected by the detector 1830, the processor generates the first data for the location in the set of locations corresponding to that current location. Each location in the set of locations has an associated entry which may or may not store first data for the location. By continuously or at least repeatedly detecting current locations of a given element using images captured by the plurality of cameras, the first data can be generated and stored for respective locations in the set of locations to populate the respective entries associated with the respective locations. For example, as shown in FIG. 20, each location in the set of locations has an entry, and for the locations 2001, 2002, 2003, 2004, 2005, the associated entry comprises first data, whereas for the other locations the associated entry does not store first data, such that the associated entry is "empty".

In embodiments of the disclosure, each location in the set of locations corresponds to a voxel defining a portion of the three-dimensional space included within the field of view of the plurality of cameras. As discussed previously, the common camera coordinate comprises a set of locations corresponding to the locations in the three-dimensional space included within the field of view of the plurality of cameras. As illustrated in FIG. 19b the grid of locations 1900 in (physical) space comprises a set of locations which may each separated by a distance d in the (x, y, z) directions. Consequently, the three-dimensional space can be divided into a plurality of discrete portions using the grid of locations 1900. Each location in the grid corresponds to a portion of the three-dimensional space. It will be appreciated that whilst FIG. 19b shows the grid in which each location separated by a distance d in the (x, y, z) directions and each location therefore corresponds to a cubic voxel (block), the respective locations may instead be separated with a distance d in the (x, y) plane and a distance m in the z plane, where d≠m and therefore each location may corresponds to a cuboid voxel.

As such, the three-dimensional space included within the field of view of the plurality of cameras can be represented using the common camera coordinate system, where the common camera coordinate systems comprises a set of locations corresponding to voxels defining respective portions of the three-dimensional space, where first and second data can be generated and stored in association with each location according to the detections made by the detector 1820 based on the captured images. In this way, second data can be stored in association with a given location corresponding to a given voxel and therefore a camera-to-camera mapping for at least two cameras can be defined for a portion of the three-dimensional space.

In embodiments of the disclosure, the plurality of cameras are configured to continuously or at least repeatedly detect the current locations of one or more of the elements and the processor is configured to generate the first data in response to the detection of the current locations of the one or more elements with respect to the common camera coordinate system. The locations of any of the one or more elements (e.g. electrically illuminable elements) can be detected with respect to a coordinate system of a given camera based on the images captured by the given camera. Therefore, based on the images captured by the given camera the detector 1830 can detect the locations of any of the one or more elements with respect to the common camera coordinate system and the processor can generate the first data for the locations of the common camera coordinate system accordingly.

In embodiments of the disclosure, the one or more elements comprise one or more electrically illuminable elements. As discussed previously, an optically detectable marker may comprise one or more elements such as one or more light emitting diodes. The location of an electrically illuminable element with respect to a camera can thus be detected and used for detecting the location of the optically detectable marker. As such, movements of the electrically illuminable elements within the three-dimensional space can be detected by the data processing apparatus 1800 to generate the first and second data for the common camera coordinate system.

In embodiments of the disclosure, the one or more electrically illuminable elements are arranged on a surface of one or more from the list consisting of: a head mountable display 1210; a handheld controller 1700; a game console 1270; and a light bar 1260. A user wearing the HMD 1210 may move around within the three-dimensional space and the one or more elements arranged on the surface of the HMD can be observed in images captured by the plurality of cameras. Similarly, a user holding a handheld controller 1700 may move the controller around within the three-dimensional space. For a given camera of the plurality of cameras, the movement of the HMD 1210 and/or the handheld controller 1700, and thus the movement of the one or more elements, causes the one or more elements to be observed at different pixel coordinates in the image frame captured by the camera, where the different pixel coordinates correspond to different current locations with respect to the camera. Therefore, the data processing apparatus 1800 can generate the first data and second data for the common camera coordinate system by tracking the current locations of the one or more elements of the HMD 1210 and/or the handheld controller 1700 based on the captured images to selectively populate the entries associated with the respective locations in the set of locations of the common camera coordinate system according to which locations are visited.

For the case where the plurality of cameras are provided as part of the HMD 1210 and arranged with respect to each other according to the predetermined configuration (for example, two or more cameras facing forwards with respect to the HMD 1210 having at least partially overlapping fields of view), one or more elements arranged on the surface of the game console 1270 or the light bar 1260 can be observed in the captured images and movement of the HMD 1210 causes the one or more elements to be observed at different pixel coordinates in the image frame captured by the camera, where the different pixel coordinates correspond to different current locations with respect to the camera. The data processing apparatus 1800 can generate the first data and second data for the common camera coordinate system by tracking the current locations of the one or more elements arranged on the surface of the game console 1270 or the light bar 1260 with respect to the common camera coordinate system.

In embodiments of the disclosure, the plurality of cameras 1810 are mounted on or proximate to one or more from the list consisting of: a head mountable display; a handheld controller; and a game console. The plurality of cameras 1810 having a fixed arrangement with respect to each other can be fixedly attached to the HMD 1210. For example, the HMD 1210 may comprise N cameras (N≥2) orientated to face in a front-facing direction or a rear-facing direction with at least two cameras having partially overlapping fields of view. Alternatively or in addition, the HMD 1210 may comprise N cameras some of which face in the front-facing direction and some of which face in the rear-facing direction. For example, referring now to FIG. 19a, the cameras 1810a, 1810b, 1810c may be mounted on the HMD 1210 and a position of the common camera 1850 associated with the common camera coordinate system can be defined according to the positions and orientations of the plurality of cameras. Similarly, the plurality of cameras 1810 having the fixed arrangement with respect to each other can be fixedly attached to the handheld controller 1270. Alternatively, the plurality of cameras 1810 having the fixed arrangement with respect to each other can be fixedly attached to or mounted proximate to the game console 1270. For example, the plurality of cameras may be mounted on a frame of the television screen 1250. For example, referring now to FIG. 19a, the cameras 1810a, 1810b, 1810c may be mounted on the frame of the television screen 1250 or may be provided as part of the image capture unit 1270.

In embodiments of the disclosure, each camera is configured to detect the location of the element in the captured images with respect to the coordinate system of the camera based on a model defining a relationship between a point in a captured image and a location with respect to the coordinate system of the camera. As discussed previously each camera of the plurality of cameras 1810 implements a camera model for mapping the three-dimensional space to the image frame captured by the camera, where the model comprises parameters that define the mapping. For example, a mapping between the three-dimensional space and a captured image frame may be represented by the following expression F=P×R, where F corresponds to a pixel coordinate in the captured image frame, P corresponds to the camera model and F corresponds to a location in the three-dimensional space. The camera model thus allows detection of a location of a given element in a captured image with respect to a location of a camera.

In embodiments of the disclosure, the model comprises one or more camera calibration parameters selected from the list consisting of: focal length; principal point; camera position; and camera orientation. The parameters used for the camera model correspond to either an intrinsic parameter of the camera or an extrinsic parameter of the camera. Intrinsic parameters are those that are dependent upon the characteristics of the camera. Such characteristics include a camera's focal length, pixel size and principal point (optical centre). Extrinsic parameters are those that are dependent upon properties that are external to the camera, which include a camera's position and orientation. The extrinsic parameters can therefore be used to define the relationship between the camera and a coordinate frame associated with the camera. The camera model can therefore be used to establish the manner in which light is projected from a scene onto a 2D image plane of the camera.

In embodiments of the disclosure, for a location in the set of locations for which the second data is not generated, the processor is configured to derive a mapping between the coordinate systems for two or more cameras for that location based on at least one of the first data and the second data generated for one or more other locations in the set of locations and to generate the second data for that location based on the derivation. As discussed previously, each location in the set of locations of the common camera coordinate system has an associated entry that can be updated to store information indicative of camera mappings. For a location corresponding to a current location detected by the detector 1830, the associated entry is updated to store the first data indicative of the mapping between a camera and the common camera coordinate system. When an entry for a location stores first data for the mapping between the common camera coordinate system and two or more cameras, the processor 1820 is configured to generate the second data for that location and update the entry to store the second data indicative of the camera-to-camera mapping for the two or more cameras.

However, depending on the locations in the three-dimensional space visited by the given element, some of the entries may store the second data, some of the entries may store the first data, and some of the entries may store no data regarding camera mappings, as illustrated in the example of FIG. 20. For a location in the set of locations for which the processor 1820 has not generated the second data, the processor 1820 can derive a relationship between two or more cameras for that location based on the data stored for the other locations in the set of locations. In this way, the second data can be generated for locations in the set of locations that have not been visited by the given element.

Figure 21:
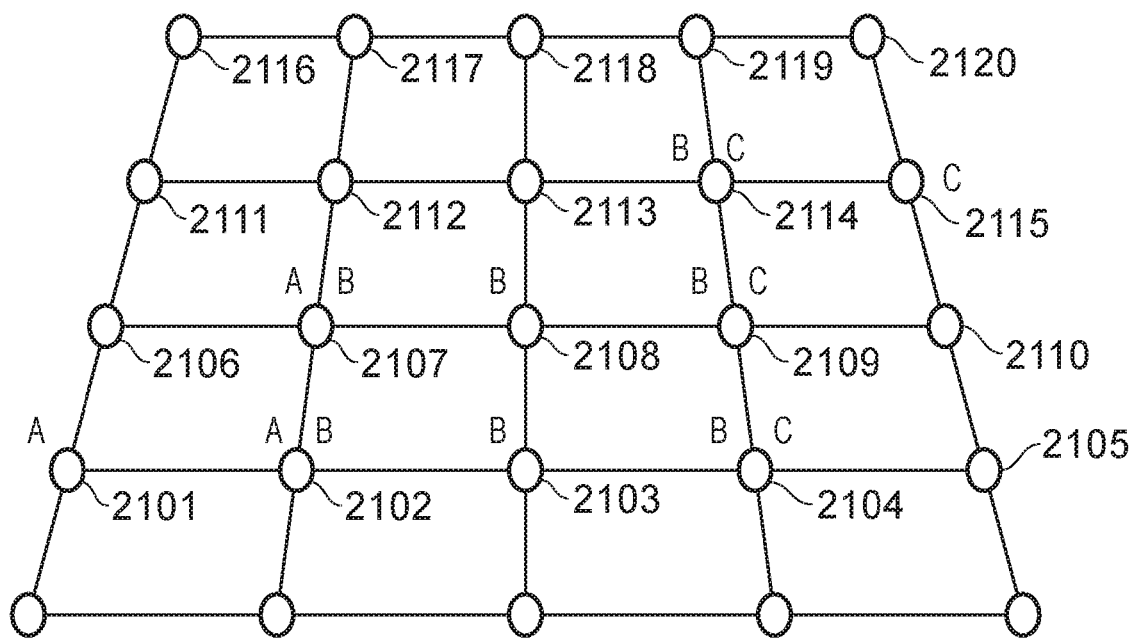
FIG. 21 schematically illustrates a derivation of a mapping.

FIG. 21 schematically illustrates an example of a two-dimensional array of locations of the common camera coordinate system for which the first data and the second data is generated. The locations having the labels "A", "B" or "C" correspond locations for which the first data and second data have been generated based on the images captured by the plurality of cameras, and the locations for which there are no labels correspond to locations which have not been visited. Locations having the label "A" correspond to locations for which the first data is indicative of the mapping between a camera A and the common camera coordinate system. Locations having the label "B" correspond to locations for which the first data is indicative of the mapping between a camera B and the common camera coordinate system. Locations having the label "C" correspond to locations for which the first data is indicative of the mapping between a camera C and the common camera coordinate system. Locations having the label "A" and "B" correspond to locations for which the second data is indicative of the mapping between the camera A and the camera B (camera-to-camera mapping for cameras A and B). Locations having the label "B" and "C" correspond to locations for which the second data is indicative of the mapping between the camera B and the camera C (camera-to-camera mapping for cameras B and C). In this case, the second data can be generated for a location for which neither the first data nor the second data has been generated by performing a mathematical derivation using the first data and/or second data generated for the one or more other locations in the set of locations.

For example, a linear extrapolation or linear interpolation of the data generated for location 2101, the data generated for location 2102 and the data generated for the location 2017 may be used to derive a mapping between the camera A and the common camera coordinate system for any of the other locations (e.g. locations 2106, 2111 and 2112) in order to generate the corresponding first data indicative of the mapping for camera A for any of those locations. Similarly, the data generated for location 2104, the data generated for location 2109, the data generated for location 2114 and the data generated for the location 2115 may be used according to a linear extrapolation calculation or a linear interpolation calculation to derive a mapping between the camera C and the common camera coordinate system for the other locations (e.g. 2105, 2110, 2119 and 2120) in order to generate the corresponding first data indicative of the mapping for camera C for any of those locations. A similar calculation can be used to generate the first data indicative of the mapping for camera B for one or more locations in the set of locations. This provides an example of deriving a mapping between a coordinate system for a single camera and the common camera coordinate system for one or more locations in the set of locations of the common camera coordinate system based on a derivation calculation using data generated based on images captured by the plurality of cameras.

In this way, for one or more locations in the set of locations for which the first data was not generated based on images captured by the plurality of cameras, the first data indicative of a mapping between a coordinate system for a single camera and the common camera coordinate system can be derived from first and second data associated with other locations in the set of locations. Using the first data derived for the one or more locations in this manner in combination with the first data generated based on images captured by the plurality of cameras, the first data indicative of a mapping for two or more cameras with respect to the common camera coordinate system can be generated for any location in the set of locations. Therefore, for an entry associated with a location in the set of locations having first data indicative of a mapping for two or more cameras with respect to the common camera coordinate system, the processor 1820 can be configured to generate the second data for that location based on a combination of the derived first data and the first data generated based on the captured images.

In embodiments of the disclosure, for a location in the set of locations for which the second data is not generated, the processor is configured to derive a mapping between the coordinate systems for two or more cameras for that location based on the second data generated for one or more other locations in the set of locations and to generate the second data for that location based on the derivation. Instead of deriving first data in the manner described above and then using the first data indicative of the mapping for two or more cameras with respect to the common camera coordinate system to generate the second data, the processor 1820 can be configured to perform a derivation calculation using only the second data generated based on captured images. In other words, instead of deriving first data for one or more locations in the set of locations and using a combination of derived first data and non-derived first data to generate the second data, the processor 1820 can derive the second data for one or more locations based on a linear extrapolation or linear interpolation of just the second data that has been generated by the processor 1820 using captured images. In this way, the processor 1820 can be configured to derive a camera-to-camera mapping for a given location in the set of locations using camera-to-camera mapping data (second data) generated for other locations in the set of locations.

In embodiments of the disclosure, the processor is configured to derive the mapping between the coordinate systems for the two or more cameras based on an interpolation of the second data generated for the one or more other locations in the set of locations. An interpolation of the data generated for location 2102 and the data generated for location 2107 may be used to derive a mapping between the camera A and the camera B for the locations 2112 and 2117 in order to generate the corresponding second data for those locations. In some examples, a linear extrapolation or linear interpolation calculation is used to derive the second data indicative of camera-to-camera mapping for a given location based on the second data generated for other locations in response to an analysis of the captured images. This provides an example of deriving a mapping between coordinate systems for at least two cameras for one or more locations in the set of locations of the common camera coordinate system in accordance with a derivation calculation using second data generated based on images captured by the plurality of cameras.

It will be appreciated that FIG. 21 represents a simplified example comprising a small number of locations for clarity of explanation and that the number of locations having the second data indicative of the camera-to-camera mapping for camera A and camera B (or camera B and camera C) may be significantly greater than that illustrated. In addition, whilst FIG. 21 illustrates locations for which the second data is indicative of a mapping between a first camera and a second camera (mapping between camera A and camera B, and mapping between camera B and camera C), it will be appreciated that for the case where N (N≥2) cameras are arranged to have overlapping fields of view, the second data can be generated for a location indicating a mapping between a given camera and each other camera of the N cameras and this data can be used to perform the derivation calculation described previously.

Figure 22:
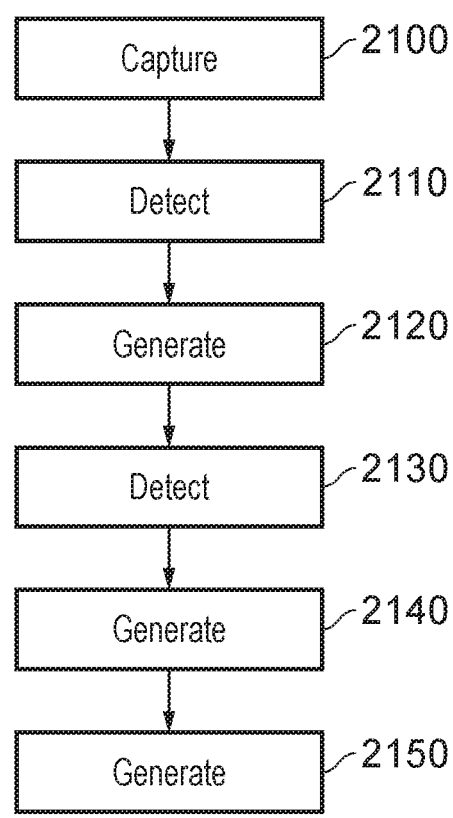
FIG. 22 is a schematic flowchart illustrating a method of generating data.

FIG. 22 is a schematic flowchart illustrating a method of generating first and second data for a common camera coordinate system. The method comprises:

capturing (at a step 2100) successive images using a plurality of cameras arranged according to a predetermined configuration and each having a coordinate system;

detecting (at a step 2110) a current location of one or more elements in the captured images with respect to the coordinate system of a camera;

generating (at a step 2120) a common camera coordinate system in dependence upon the respective coordinate systems of the plurality of cameras, the common camera coordinate system comprising a set of locations in a three-dimensional space included within the field of view of the plurality of cameras;

detecting (at a step 2130) a current location of a given element with respect to the common camera coordinate system based on images captured by the plurality of cameras;

for each camera:

generating (at a step 2140), in response to detecting that the current location of the given element corresponds to a location in the set of locations of the common camera coordinate system, first data for that location in the set of locations indicative of a mapping between the coordinate system for the camera and the common camera coordinate system; and generating (at a step 2150), in response to a detection of a location in the set of locations for which the first data is indicative of the mapping for two or more cameras with respect to the common camera coordinate system, second data for that location indicative of a mapping between the coordinate systems for the two or more cameras.

It will be appreciated that example embodiments can be implemented by computer software operating on a general purpose computing system such as a games machine. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

It will also be apparent that numerous modifications and variations of the present disclosure are possible in light of the above teachings. It is therefore to be understood that within the scope of the appended claims, the disclosure may be practised otherwise than as specifically described herein.

The invention claimed is:

1. A data processing apparatus comprising:
a plurality of cameras arranged according to a predetermined configuration, wherein each camera is configured to capture successive images and to detect a current location of one or more elements in the captured images with respect to a coordinate system of the camera;
a processor to generate a common camera coordinate system in dependence upon respective coordinate systems of the plurality of cameras, in which the processor is configured to generate the common camera coordinate system to comprise a generated set of locations including a three-dimensional array of evenly or non-evenly spaced locations in a three-dimensional space included within a field of view of the plurality of cameras, each location of the set of locations having an associated entry that is empty; and
a detector to detect a current location of a given element with respect to the common camera coordinate system based on images captured by the plurality of cameras, wherein
for each camera, the processor is configured, in response to a detection by the detector that the current location of the given element corresponds to a location in the set of locations of the common camera coordinate system, to generate first data for that location in the set of locations indicative of a mapping between the coordinate system for the camera and the common camera coordinate system and populate an associated entry for that location with the first data, and wherein
in response to a detection of a location in the set of locations for which the first data is indicative of the mapping for two or more cameras with respect to the common camera coordinate system, the processor is configured to generate second data for that location indicative of a mapping between the coordinate systems for the two or more cameras and populate an associated entry for that location with the second data.

2. A data processing apparatus according to claim 1, wherein the processor is configured to generate the first data for each current location of the given element to generate the first data for at least a plurality of locations in the set of locations.

3. A data processing apparatus according to claim 2, wherein for a location in the set of locations for which the second data is not generated, the processor is configured to derive a mapping between the coordinate systems for two or more cameras for that location based on at least one of the first data and the second data generated for one or more other locations in the set of locations and to generate the second data for that location based on the derivation.

4. A data processing apparatus according to claim 2, wherein for a location in the set of locations for which the second data is not generated, the processor is configured to derive a mapping between the coordinate systems for two or more cameras for that location based on the second data generated for one or more other locations in the set of locations and to generate the second data for that location based on the derivation.

5. A data processing apparatus according to claim 4, wherein the processor is configured to derive the mapping between the coordinate systems for the two or more cameras based on an interpolation of the second data generated for the one or more other locations in the set of locations.

6. A data processing apparatus according to claim 2, wherein the plurality of cameras are configured to repeatedly detect the current locations of one or more of the elements and the processor is configured to generate the first data in response to the detection of the current locations of the one or more elements with respect to the common camera coordinate system.

7. A data processing apparatus according to claim 1, wherein each location in the set of locations corresponds to a voxel defining a portion of the three-dimensional space included within the field of view of the plurality of cameras.

8. A data processing apparatus according to claim 1, wherein each camera is configured to detect the location of the given element in the captured images with respect to the coordinate system of the camera based on a model defining a relationship between a point in a captured image and a location with respect to the coordinate system of the camera.

9. A data processing apparatus according to claim 8, wherein the model comprises one or more camera calibration parameters from among:
focal length;
principal point;
camera position; and
camera orientation.

10. A data processing apparatus according to claim 1, wherein one or more elements comprise one or more electrically illuminable elements.

11. A data processing apparatus according to claim 10, wherein the one or more electrically illuminable elements are arranged on a surface of one or more of:
a head mountable display;
a handheld controller;
a game console; and
a light bar.

12. A data processing apparatus according to claim 1, wherein the plurality of cameras are mounted on or proximate to one or more of:
a head mountable display;
a handheld controller; and
a game console.

13. A method comprising:
capturing successive images using a plurality of cameras arranged according to a predetermined configuration and each having a coordinate system;
detecting a current location of one or more elements in the captured images with respect to the coordinate system of a camera;

generating a common camera coordinate system in dependence upon the respective coordinate systems of the plurality of cameras, comprising generating the common camera coordinate system to comprise a generated set of locations including a three-dimensional array of evenly or non-evenly spaced locations in a three-dimensional space included within a field of view of the plurality of cameras, each location of the set of locations having an associated entry that is empty;

detecting a current location of a given element with respect to the common camera coordinate system based on images captured by the plurality of cameras;

for each camera:

generating, in response to detecting that the current location of the given element corresponds to a location in the set of locations of the common camera coordinate system, first data for that location in the set of locations indicative of a mapping between the coordinate system for the camera and the common camera coordinate system and populating an associated entry for that location with the first data; and generating, in response to a detection of a location in the set of locations for which the first data is indicative of the mapping for two or more cameras with respect to the common camera coordinate system, second data for that location indicative of a mapping between the coordinate systems for the two or more cameras and populating an associated entry for that location with the second data.

14. A non-transitory, computer readable storage medium containing computer software which, when executed by a computer, causes the computer to perform a method, comprising:

capturing successive images using a plurality of cameras arranged according to a predetermined configuration and each having a coordinate system;

detecting a current location of one or more elements in the captured images with respect to the coordinate system of a camera;

generating a common camera coordinate system in dependence upon the respective coordinate systems of the plurality of cameras, comprising generating the common camera coordinate system to comprise a generated set of locations including a three-dimensional array of evenly or non-evenly spaced locations in a three-dimensional space included within the field of view of the plurality of cameras, each location of the set of locations having an associated entry that is empty;

detecting a current location of a given element with respect to the common camera coordinate system based on images captured by the plurality of cameras;

for each camera:

generating, in response to detecting that the current location of the given element corresponds to a location in the set of locations of the common camera coordinate system, first data for that location in the set of locations indicative of a mapping between the coordinate system for the camera and the common camera coordinate system and populating an associated entry for that location with the first data; and generating, in response to a detection of a location in the set of locations for which the first data is indicative of the mapping for two or more cameras with respect to the common camera coordinate system, second data for that location indicative of a mapping between the coordinate systems for the two or more cameras and populating an associated entry for that location with the second data.

* * * * *